US012761876B2

(12) United States Patent
Fouda

(10) Patent No.: US 12,761,876 B2
(45) Date of Patent: Oct. 13, 2026

(54) FLEXIBLE ARCHITECTURE FOR FLOATING-POINT AND INTEGER COMPUTE-IN-MEMORY

(71) Applicant: OpenAI Opco, LLC, San Francisco, CA (US)

(72) Inventor: Mohammed Elneanaei Abdelmoneem Fouda, Alexandria, VA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/542,519

(22) Filed: Feb. 17, 2026

(65) Prior Publication Data

US 2026/0244404 A1 Aug. 20, 2026

Related U.S. Application Data

(60) Provisional application No. 63/759,884, filed on Feb. 18, 2025.

(51) Int. Cl.
*G06F 7/544* (2006.01)
*G06F 7/487* (2006.01)

(52) U.S. Cl.
CPC .......... *G06F 7/5443* (2013.01); *G06F 7/4876* (2013.01); *G06F 2207/3824* (2013.01)

(58) Field of Classification Search
CPC ................. G06F 7/4876; G06F 7/5443; G06F 2207/3824
See application file for complete search history.

(56) References Cited

U.S. PATENT DOCUMENTS

2018/0321938 A1* 11/2018 Boswell ................ G06F 9/3001
2021/0263993 A1 8/2021 Urbanski et al.
(Continued)

FOREIGN PATENT DOCUMENTS

EP 3396524 A1 10/2018
EP 3396547 A2 10/2018

OTHER PUBLICATIONS

International Search Report and Written Opinion for PCT/US2026/015583 dated May 29, 2026.

*Primary Examiner* — Carlo Waje
(74) *Attorney, Agent, or Firm* — Finnegan, Henderson, Farabow, Garrett & Dunner, LLP

(57) ABSTRACT

The disclosure describes systems and methods for mixed-mode, mixed-precision computation using a configurable compute engine for vector-matrix operations. A processing system selects a floating-point mode or an integer mode, selects a precision, and gates inactive datapath portions to reduce energy and stabilize latency. Streaming and stationary operand registers supply compute circuitry that, in floating-point mode, forms a mantissa product and product exponent, combines signs, and aligns the product using a power-of-two generator that drives a selection network based on the exponent. In integer mode, the same selection network performs integer multiplication from bitwise inputs, with sign handling applying two's-complement correction prior to accumulation. Parallel adder trees feed a hierarchical output accumulator sized to the selected precision, and normalization performs leading-one detection, mode-dependent exponent correction, rounding, and zero flushing. Optional dequantization folds scale tensors into the exponent path, and implementations support compute-in-memory or conventional accelerators.

20 Claims, 8 Drawing Sheets

(56) References Cited

U.S. PATENT DOCUMENTS

| | | | | |
|---|---|---|---|---|
| 2025/0094125 | A1* | 3/2025 | Khwa | G06F 7/50 |
| 2025/0110697 | A1* | 4/2025 | Wang | G06F 7/5443 |
| 2025/0117440 | A1* | 4/2025 | Jang | G06F 17/16 |
| 2025/0245007 | A1* | 7/2025 | Lies | G06F 7/483 |
| 2025/0309866 | A1* | 10/2025 | Friddell | H03H 17/0225 |

* cited by examiner

FLEXIBLE ARCHITECTURE FOR FLOATING-POINT AND INTEGER COMPUTE-IN-MEMORY

CROSS-REFERENCE TO RELATED APPLICATIONS

This application claims the benefit, pursuant to 35 U.S.C. § 119(e) and 37 C.F.R. § 1.78(a), of U.S. Provisional Application No. 63/759,884, filed Feb. 18, 2025. The disclosure of U.S. Provisional Application No. 63/759,884 is hereby incorporated by reference herein in its entirety.

BACKGROUND

Modern high-performance compute platforms increasingly target data-intensive workloads such as machine learning training and inference, signal processing, and large-scale numerical analytics. These workloads are often dominated by linear-algebra kernels, including vector-matrix and matrix-matrix operations, and place simultaneous demands on throughput, latency, and energy efficiency. To meet diverse application needs, many systems support multiple numeric representations (e.g., floating-point and integer) and a range of precisions to balance model accuracy, memory footprint, and compute cost.

As numeric variety grows, system designers increasingly weigh tradeoffs in datapath organization and result handling. Microarchitectural choices in these areas can influence cycle time, area, and power, and different designs may make different tradeoffs depending on workload and platform constraints.

Many workflows also shift between precisions to keep accuracy where it matters and to reduce energy cost where it does not. In some implementations, accommodating multiple formats and arithmetic types across a broad range of models can increase datapath complexity and control overhead, and may lead to designs that are sized for worst-case operating points even when typical operating points are narrower. These factors can increase energy consumption and can make it harder to maintain predictable behavior when switching between floating-point and integer arithmetic across deployment targets.

In a variety of implementations, datapaths that perform multiply and/or accumulate style operations must manage operand preparation, product alignment, sign handling, partial-sum reduction, and final formatting of results. As systems scale to support wider vectors, deeper trees, and more concurrent operations, conventional designs can inefficiently utilize compute resources while supporting multiple numeric representations and precision ranges.

Quantized and mixed-precision workflows further introduce scale management and numeric consistency concerns, including how scaling factors are combined with intermediate results across a computation pipeline. At the same time, trends toward memory-centric and near-memory computing highlight the costs associated with data movement relative to arithmetic, motivating approaches that reduce latency and improve bandwidth utilization during accumulation and result formation. Designing compute fabrics that operate flexibly across modes and precisions while maintaining predictable performance and efficiency continues to be an active engineering focus.

SUMMARY

The disclosed technology provides systems, methods, and techniques to support mixed mode and mixed precision computation while keeping alignment, sign handling, reduction, and normalization efficient, thereby enabling a single compute engine to support mixed numerical modes and multiple precisions. Such mechanisms can allow a processing system to choose a mode and a precision, to gate unused hardware resources, and to maintain a consistent flow of products into accumulation so that latency stays stable and energy per operation is reduced in a form that scales across different integration styles.

The disclosed technology provides a compute engine that dynamically operates between floating-point or integer modes and selects among multiple precisions to meet workload objectives. The engine may organize operand staging, product generation, alignment, sign handling, accumulation, and result normalization as a coherent pipeline. Based on the selected mode and precision, the engine may enable only the datapath portions that are needed. This arrangement may improve throughput and energy behavior without forcing software to rework its math kernels or dataflows.

In floating-point mode, the compute circuitry is configured to produce a mantissa product and a product exponent and to combine signs, while alignment is driven by a power-of-two value that corresponds to the product exponent through a selection network. In integer mode, the same selection fabric is driven to realize integer multiplications of operand values. Sign handling may prepare negatives using two's complement before reduction. Accumulation may be performed by parallel adder trees that feed a hierarchical output accumulator and only the necessary parts may be activated for the chosen precision. Normalization may format the output with leading one detection, a mode-dependent exponent correction, selectable rounding, and a zero flush path. In some embodiments dequantization may fuse scale tensors into the exponent path and mantissa product logic may preserve subnormal behavior using a bitwise OR mechanism.

The engine maps naturally to vector matrix math where stationary registers hold a matrix and streaming registers deliver a vector to form dot products. In certain versions the compute circuitry may be integrated with memory arrays so portions of multiply accumulate operations occur near stored operands. Other versions may include multiplication multiplexers that route integer operand bits or partial products to the accumulation path, and may operate as a fused multiply and add datapath that aligns products according to the product exponent. Across these cases precision selection and gating may keep the design responsive to workload needs.

Some aspects of the disclosed technology are directed to a computing system that includes a processing system and a compute engine coupled to the processing system. The processing system is configured to select a mode that includes floating-point or integer operation and to select a precision from multiple precisions and to gate portions of the compute engine based on those selections. The compute engine includes operand registers for operand values, compute circuitry that in floating-point mode produces a mantissa product and a product exponent and combines signs, alignment circuitry with a power-of-two generator and a selection network that in floating-point mode aligns the mantissa product using a power-of-two value that corresponds to the product exponent and that in integer mode drives the selection network to perform integer multiplications of operand values, sign handling circuitry that manages negative values including two's complement handling in the integer mode prior to accumulation, accumulation circuitry with parallel adder trees and a hierarchical output accumulator, and normalization circuitry that forms an output value in a numeric format.

Other aspects of the disclosed technology are directed to methods of operating such a compute engine. A method includes selecting a mode that includes floating-point or integer operation, selecting a precision from multiple precisions, and gating portions of the compute engine based on the selections. The method includes producing in floating-point mode a mantissa product and a product exponent and combining signs, aligning in floating-point mode the mantissa product using a power-of-two generator and a selection network, and driving in integer mode the selection network to perform integer multiplications of operand values. The method includes managing negative values using sign handling circuitry that performs two's complement handling in the integer mode prior to accumulation, accumulating aligned products using parallel adder trees and a hierarchical output accumulator, and normalizing an output sum using normalization circuitry to form an output value in a numeric format.

Yet other aspects are directed to an apparatus that implements the datapath. The apparatus includes operand registers for operand values, compute circuitry that in floating-point mode produces a mantissa product and a product exponent and combines signs, alignment circuitry with a power-of-two generator and a selection network that in floating-point mode aligns the mantissa product using a power-of-two value that corresponds to the product exponent and that in integer mode drives the selection network to perform integer multiplications of operand values, sign handling circuitry that manages negative values including two's complement handling in the integer mode prior to accumulation, accumulation circuitry with parallel adder trees and a hierarchical output accumulator, and normalization circuitry that forms an output value in a numeric format.

These arrangements allow one engine to support mixed precision operation while reusing alignment circuitry across modes and gating inactive resources to save energy. The hierarchical accumulation and flexible normalization may deliver a consistent path to final results, and the optional dequantization path may simplify quantized workflows by folding scale control into the exponent logic. This broader organization may reduce latency variance, lower total energy per operation, and maintain predictable behavior as software selects among floating-point and integer modes and across supported precisions.

In many deployments the approach maps cleanly to vector matrix workloads and may adapt across platform styles that prefer memory proximity or conventional accelerator integration while keeping control surfaces simple for software.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Figure 1:
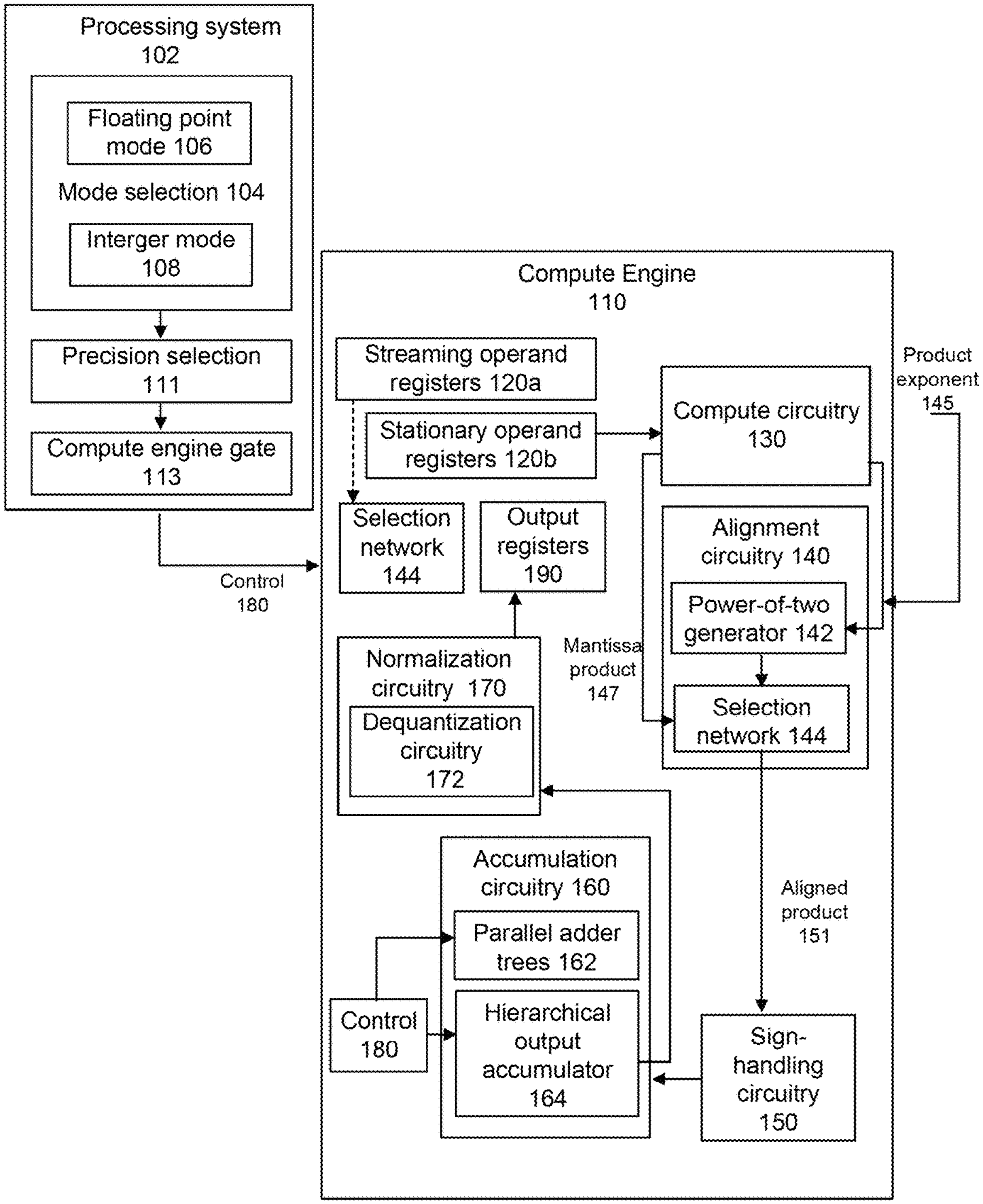
FIG. 1 illustrates an example block diagram of a computing system in which a processing system provides mode and precision control to a compute engine that includes operand registers, compute circuitry, alignment circuitry, sign handling circuitry, accumulation circuitry, normalization with dequantization, and output registers, in accordance with some aspects of the present technology.

The following disclosure provides various embodiments and examples for implementing features of the invention. Specific examples of components and arrangements are described to simplify the present disclosure. These examples are not intended to be limiting. For instance, the formation of a first feature over or on a second feature may include embodiments in which the two features are in direct contact, as well as embodiments in which additional features are interposed between them. Reference numerals and/or letters may be repeated across examples for clarity and simplicity, and such repetition does not imply a specific relationship between embodiments.

Some of the disclosed embodiments are described with reference to the accompanying drawings. However, it will be understood by those skilled in the art that the principles of the example methods and systems may be practiced without every specific detail. Well-known methods, procedures, and components have not been described in detail so as not to obscure the principles of some of the disclosed methods and systems. Unless explicitly stated, the example methods and processes described herein are neither constrained to a particular order or sequence nor constrained to a particular system configuration. Additionally, some of the described methods and systems or elements thereof can occur or be performed (e.g., executed) simultaneously, at the same point in time, or concurrently. Reference will now be made in detail to some of the disclosed methods and systems, examples of which are illustrated in the accompanying drawings.

It is to be understood that both the foregoing general description and the following detailed description are only explanatory and are not restrictive of this disclosure. The accompanying drawings, which are incorporated in and constitute a part of this specification, illustrate several disclosed methods and systems and together with the descriptions serve to outline principles of some of the disclosed methods and systems.

Spatially relative terms such as "beneath," "below," "lower," "above," "upper," and similar descriptors are used for convenience in describing the relative positioning of elements as illustrated in the figures. These terms are intended to encompass different orientations of the device in use or operation, and should not be interpreted as limiting the scope of the invention to the depicted orientation.

The disclosed technology may address compute workloads that mix floating-point and integer arithmetic across varying precisions while maintaining predictable performance and energy behavior. In some embodiments, the datapath may be organized so that a processing system selects a mode and precision and only the circuitry necessary for that operating point evaluates, which may reduce switching, tighten timing, and keep latency stable as software transitions between numeric styles. By aligning floating-point products using power-of-two-driven placement and by reusing the same alignment fabric to realize integer multiplications, the arrangement may unify FP and INT execution under a single control surface and reduce the need for separate shifters or duplicative multipliers.

In some environments, streaming operands may vary each evaluation phase while stationary operands may be reused across phases (e.g., vector-matrix patterns). Sign handling for integer operation may be performed prior to accumulation using two's-complement formation so that downstream reduction behaves predictably, and accumulation may employ parallel adder trees that feed a hierarchical output accumulator whose active stages track the chosen width. Normalization may provide leading-one detection, mode-dependent exponent correction, and configurable rounding—e.g., truncate, round-to-nearest, or round-to-even—with an optional zero-flush path; dequantization may be fused into the exponent path when scales are present. Collectively, these choices may improve throughput per watt while preserving accuracy expectations at the selected precision.

To address limitations of conventional pipelines, such as wide, always-on shifting and late sign correction, the disclosed technology may provide exponent-guided routing for floating-point placement, integer partial-product formation through the same selection network, pre-accumulation sign handling in integer paths, and precision-aware gating of the reduction stages. This approach may reduce latency variance between modes, avoid unnecessary toggling when narrower formats suffice, and simplify integration into compute-in-memory or accelerator contexts without forcing software to re-author kernels.

In some embodiments, a computing system may include a processing system and a compute engine. The processing system may select a mode (floating-point or integer), choose a precision from multiple supported formats, and gate portions of the compute engine responsive to those selections. The compute engine may include operand registers; compute circuitry that, in floating-point mode, produces a mantissa product and product exponent and combines signs; alignment circuitry with a power-of-two generator and a selection network configured to, in floating-point mode to align the mantissa product using a power-of-two value corresponding to the product exponent and, in integer mode, to drive the selection network to perform integer multiplications; sign-handling configured to manage negative values, including two's-complement handling before accumulation in integer mode; accumulation circuitry including a plurality of parallel adder trees and a hierarchical output accumulator; and normalization circuitry configured to form an output value in a selected numeric format.

In some embodiments, the operand registers may include streaming operand registers that present new values each evaluation phase and stationary operand registers that retain values across phases, which may reduce memory traffic and keep the compute pipeline fed.

Exponent alignment during multiplication may be performed by the alignment circuitry: a power-of-two generator may drive the selection network so the mantissa product is placed at the correct significance prior to reduction, thereby realizing alignment as routing rather than general-purpose shifting.

The power-of-two generator may include at least one of: an address decoder, a lookup table, or combinational logic that produces mutually exclusive control lines corresponding to powers of two, allowing implementers to balance area, fan-in, and energy.

The asserted placement value may correspond to 2 E, where E is the product exponent, so that the mantissa product enters reduction at the intended weight.

Responsive to the selected mode or precision, only the necessary subset of parallel adder trees and stages of the hierarchical output accumulator may be enabled, which may reduce dynamic power while preserving numerical equivalence.

Normalization circuitry may perform leading-one detection, compute an output exponent with a mode-dependent correction, apply a configurable rounding policy—e.g., truncate, round-to-nearest, or round-to-even—and flush to zero responsive to a zero flag, thereby providing consistent range and tie-breaking behavior.

In some embodiments, dequantization circuitry within the normalization block may fuse scale tensors and streaming scales into the output exponent so that scaling is handled within the datapath rather than as a post-processing step.

The compute circuitry may include mantissa-product logic configured to preserve subnormal values, for example by enforcing a zero immediately after the radix point via a bitwise OR mechanism; where policy flushes subnormals to zero, this conditioning may be disabled.

In a vector-matrix use case, stationary registers may hold a matrix operand while streaming registers provide a vector operand; the compute circuitry may multiply corresponding elements and accumulate products to form dot-product results, which may map naturally to ML and signal-processing kernels.

Selecting the precision may include choosing among at least two floating-point formats and at least one integer format; gating may selectively enable a subset of the parallel adder trees based on the chosen precision to limit toggling to the active width.

In integer mode, the compute engine may include multiplication multiplexers arranged to selectively route integer operand bits or partial products to accumulation, and driving the selection network may include controlling those multiplexers to implement integer multiplication without a dedicated barrel shifter.

In floating-point mode, the compute circuitry and the accumulation circuitry may operate as a fused multiply-and-add datapath in which the mantissa product is aligned based on the product exponent before it enters reduction, which may reduce latency relative to shift-then-sum approaches.

The system may include pre-output accumulator circuitry between the adder trees and the hierarchical output accumulator, configured to condition partial sums (e.g., apply sign correction) prior to final accumulation to stabilize carry distances and simplify rounding.

The hierarchical output accumulator may include multiple stages arranged to accumulate partial sums across multiple evaluation phases and then combine accumulated results to produce the output value, enabling wide reductions without undue critical-path growth.

A method may include selecting a mode and precision; gating portions of a compute engine responsive to those selections; in floating-point mode, producing a mantissa product and product exponent and combining signs; in floating-point mode, aligning the mantissa product using a power-of-two-driven selection network; in integer mode, driving the selection network to perform integer multiplications; applying two's-complement handling prior to accumulation for integer paths; accumulating via parallel adder trees and a hierarchical output accumulator; and normalizing an output sum to form an output value.

The method may further include using streaming operand registers for values that change each evaluation and stationary operand registers for values reused across evaluations, thereby reducing external bandwidth and smoothing pipeline cadence.

Exponent alignment in the method may be performed by the alignment circuitry, in which a power-of-two generator drives the selection network to place the mantissa product based on the product exponent prior to reduction.

The method may include realizing the power-of-two generator as an address decoder, a lookup table, or combinational logic that produces mutually exclusive control lines corresponding to powers of two, allowing flexibility while preserving placement semantics.

In an apparatus view, operand registers may stage values; compute circuitry, in floating-point mode, may produce a mantissa product and product exponent and combine signs; alignment circuitry with a power-of-two generator and selection network may align the mantissa product as part of multiplication using a power-of-two value corresponding to the product exponent and drive integer multiplications in the integer mode; sign-handling may manage negative values including two's-complement handling prior to accumulation; accumulation may employ a plurality of parallel adder trees and a hierarchical output accumulator; and normalization may form an output value in a numeric format.

Collectively, the architectural elements described above may provide a general approach to select a numeric mode, choose a precision, and enable only the datapath portions needed for that choice; align floating-point products using exponent-guided routing; realize integer multiplication through the same selection fabric; apply sign handling before accumulation for integer paths; reduce via parallel trees and a hierarchical accumulator sized to width; and normalize with consistent rounding and zero semantics while optionally fusing dequantization. By coordinating control in this manner and allowing precision-aware gating, the compute engine may adapt to diverse deployment contexts-including memory-centric and accelerator-style integrations-without constraining claim scope.

FIG. 1 illustrates an example computing system in which a processing system 102 coordinates operation of a compute engine 110. As shown in the processing system 102 portion of FIG. 1, processing system 102 may implement a control flow that proceeds through a mode selection 104, a precision selection 111, and a compute engine gate 113. Processing system 102 may select a floating-point mode 106 or an integer mode 108 for compute engine 110, may select a precision from multiple supported precisions, and may gate portions of compute engine 110 responsive to the selections. The selections may be conveyed along Control 180, which may reach one or more sub-blocks within compute engine 110 to configure routing and to enable only the circuitry that is relevant to the active mode and precision. Processing system 102 may include control circuitry that orchestrates arithmetic operations and datapath configuration and may include one or more processors, microcontrollers, sequencers, or finite state machines that write configuration registers and assert enable signals.

In the illustrated flow, mode selection 104 may establish the arithmetic context used by compute engine 110 during a given evaluation phase or workload segment. In one example, selecting floating-point mode 106 may configure downstream circuitry to interpret operands as including sign, exponent, and mantissa fields and to generate exponent-related metadata for alignment and normalization. In another example, selecting integer mode 108 may configure downstream circuitry to interpret operands as integer words and to apply integer-domain sign conventions (e.g., two's-complement handling) prior to reduction. After mode selection 104, precision selection 111 may identify an operand representation and datapath width (e.g., a floating-point precision such as FP8, FP6, or FP4, and/or an integer precision such as INT8, INT6, or INT4), and may influence internal packing, reduction width, and formatting behavior used to emit results. Compute engine gate 113 may then apply the selected mode and precision to generate block-enable signals (e.g., gating masks) that control which portions of compute engine 110 evaluate for the selected operating point, such as enabling only the relevant datapath slices, routing resources, and reduction stages needed for the selected mode and precision while holding other portions quiescent.

Control 180 may be implemented with a logical or physical control path that carries mode bits, precision codes, and block enable signals generated by the mode selection 104, precision selection 111, and compute engine gate 113, and may be implemented as a memory-mapped register interface, a sideband control bus, or a bundle of dedicated wires that fan out to the elements of compute engine 110. In some implementations, the precision may specify the number of bits allocated to a floating-point mantissa and exponent or to the number of bits in an integer word. Example precisions may include FP8, FP6, FP4, INT8, INT6, and INT4. In some embodiments gating may include selectively enabling or disabling logic or memory elements so that dynamic power and sometimes leakage power scale with the active data width and the functions that are in use.

Compute engine 110 may receive operands, may produce intermediate products, may align those products, may manage sign conventions for integer operation, may accumulate partial sums, and may normalize a result into a selected numeric format before presenting a final value to output registers 190. Compute engine 110 may be implemented with hardware and/or software that performs multiply accumulate style operations across floating-point and integer domains with configurable precision, and may include the sub-blocks shown as well as circuitry that provides equivalent functions. The arrangement in FIG. 1 may be a pipeline in which values move from operand registers through compute and alignment into sign handling and accumulation, then into normalization and finally into output registers 190. This organization may allow high throughput while preserving flexibility across modes and precisions.

Streaming operand registers 120*a* and stationary operand registers 120*b* may stage operands for compute engine 110. Streaming operand registers 120*a* may receive values that vary on a cycle by cycle basis such as elements of a vector that is being processed lane by lane. Stationary operand registers 120*b* may hold values that persist across multiple cycles such as elements of a matrix tile that are reused as the vector advances. Streaming operand registers 120*a* and stationary operand registers 120*b* may both feed compute circuitry 130 for floating-point operation and streaming operand registers 120*a* may also provide bitwise inputs to selection network 144 for integer operation as indicated by the dotted connection.

Streaming operand registers 120*a* may be implemented with latches or register files that present new operand portions at the evaluation cadence of compute engine 110, and may support vector access patterns where a new lane is presented each cycle. Stationary operand registers 120*b* may be configured as hardware and/or software for local storage that retains operand tiles for reuse across several streaming updates, which may reduce memory traffic and may keep the compute pipeline fed. In some embodiments streaming operand registers 120*a* and stationary operand registers 120*b* may include packing, unpacking, or padding logic so that smaller formats align to a common internal word layout. In some embodiments, the operand registers may stage operand values, with the streaming operand registers configured to receive operand values for a current evaluation phase and the stationary operand registers configured to hold operand values across multiple evaluation phases.

Compute circuitry 130 may operate in floating-point mode to produce a mantissa product 147 and a product exponent 145 and may combine operand signs for downstream use. Compute circuitry 130 may include a mantissa multiplier, an exponent adder, and sign combination logic arranged so that the mantissa path and the exponent path proceed in parallel. In some embodiments, mantissa product 147 may represent the product of input mantissas in floating-point mode, and product exponent 145 may represent a scale value produced by exponent addition or an equivalent exponent computation. In some embodiments compute circuitry 130 may include product mantissa handling that preserves subnormal behavior by ensuring a defined bit position after the radix point using a bitwise operation, and in other embodiments compute circuitry 130 may omit that behavior when inputs are flushed to zero according to a selected numeric policy. The outputs of compute circuitry 130 may feed alignment circuitry 140.

Alignment circuitry 140 may align mantissa product 147 according to product exponent 145 in floating-point mode and may drive integer multiplication patterns in integer mode using a common fabric. Alignment circuitry 140 may include a power-of-two generator 142 and a selection network 144. Power-of-two generator 142 may receive product exponent 145 and may produce a set of mutually exclusive control lines that represent a power-of-two value. Selection network 144 may receive mantissa product 147 together with the control lines from power-of-two generator 142 and may form an aligned product 151 that is positioned for reduction. In integer mode selection network 144 may be driven by Control 180 and by bitwise inputs from streaming operand registers 120*a* so that selection network 144 implements integer multiplications without relying on a floating-point barrel shifter. Power-of-two generator 142 may be configured to decode or lookup circuitry that asserts one of many control lines based on an exponent field so that a power-of-two placement is realized by routing rather than arithmetic shifting. Selection network 144 may include multiplexers, crossbars, or other routing fabrics that place bits or partial products in defined positions for subsequent addition. Aligned product 151 may include a value that has been positioned to share a numeric alignment with other values entering the reduction path.

Sign handling circuitry 150 may prepare values for accumulation when compute engine 110 is in integer mode by applying two's complement handling prior to reduction. In floating-point mode sign handling circuitry 150 may combine sign information with aligned product 151 according to the selected representation or may pass sign information forward for use during normalization. The two's complement handling may be configured to form a two's complement representation for a negative operand or partial product by inverting bits and adding one under sign control so that downstream addition follows standard integer addition rules. Using sign handling circuitry 150 in this location may reduce correction steps later in the pipeline and may stabilize cycle counts across operating modes.

Accumulation circuitry 160 may reduce aligned product 151 across many lanes or time slices and may include parallel adder trees 162 and a hierarchical output accumulator 164. Parallel adder trees 162 may combine many inputs using a tree structure so that latency scales with the logarithm of the input count while maintaining high throughput. Hierarchical output accumulator 164 may accept partial sums from parallel adder trees 162 and may combine those partial sums into an accumulated sum over one or more stages. Control 180 may enable only a subset of parallel adder trees 162 and only a subset of accumulator stages within hierarchical output accumulator 164 so that the active hardware tracks the selected precision and mode. An adder tree may include a network of adders that collapses many inputs into fewer values over several levels, and, in some embodiments hierarchical output accumulator 164 may be configured to produce a stable accumulated sum ready for formatting. This arrangement may allow the same hardware to serve wide floating-point precisions and narrower integer precisions while keeping energy proportional to the work performed.

Normalization circuitry 170 may format the accumulated sum into the selected numeric output format and may include leading one detection, an exponent correction that depends on mode and precision, a selectable rounding behavior, and a zero flag path that flushes to zero when indicated. Dequantization circuitry 172 may be disposed within normalization circuitry 170 and may fuse scale information into the exponent or shift path so that quantized workflows are handled inside compute engine 110 rather than by separate post-processing. Output registers 190 may capture the normalized value for consumption by downstream logic or software. Normalization circuitry 170 may include logic that converts an intermediate sum into a well-formed floating-point or fixed-point value by shifting and adjusting an exponent or by applying an integer shift and saturation behavior depending on mode. For example, leading one detection may include circuitry that may identify the most significant set bit to determine a shift amount, and exponent correction may include adding or subtracting a compensation value so that the exponent may fall within the intended range of the output format. For example, rounding may include truncate, round-to-nearest, or round-to-even behaviors that may be selected by configuration. For example, a zero flag may include a condition indicating that the accumulated sum is zero so that the output may be driven to the defined representation of zero. For example, dequantization circuitry 172 may include logic that may combine per operand or per tensor scale values with the exponent or shift path to produce numerically scaled results. For example, output registers 190 may include storage elements that may present a stable interface to subsequent blocks and may support double buffering or handshake protocols to sustain throughput.

An example flow through FIG. 1 may proceed as follows. Processing system 102 may perform mode selection 104 (e.g., floating-point mode 106 or integer mode 108), perform precision selection 111, and assert compute engine gate 113 to configure Control 180 for the selected operating point. Streaming operand registers 120*a* may present vector elements while stationary operand registers 120*b* may present a matrix tile. Compute circuitry 130 may multiply mantissas to form mantissa product 147 and may compute product exponent 145 while combining signs. Power-of-two generator 142 may decode product exponent 145 and selection network 144 may form aligned product 151 for entry into sign handling circuitry 150. Parallel adder trees 162 may reduce aligned values into partial sums and hierarchical output accumulator 164 may produce an accumulated sum using a number of stages that are enabled by Control 180. Normalization circuitry 170 may detect a leading one, may apply an exponent correction that depends on the active mode and precision, may apply a selected rounding behavior, and may flush to zero when a zero flag condition is present. Dequantization circuitry 172 may fuse scale information when available and output registers 190 may capture the final value.

Figure 2:
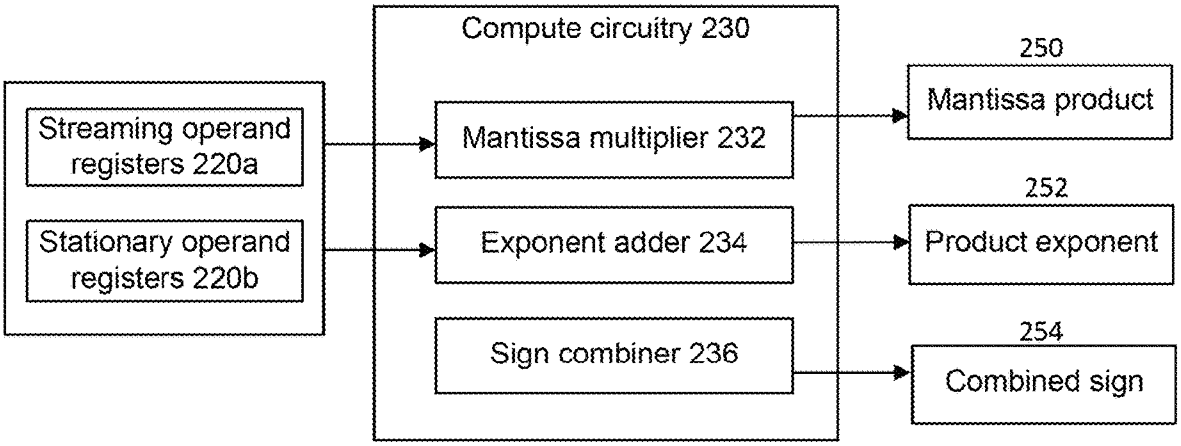
FIG. 2 illustrates an example block diagram of compute circuitry showing a mantissa multiplier, an exponent adder, and a sign combiner that receive streaming and stationary operands and produce a mantissa product, a product exponent, and a combined sign, in accordance with some aspects of the present technology.

FIG. 2 illustrates an example arrangement of compute circuitry 230 that may receive operands from streaming operand registers 220*a* and stationary operand registers 220*b*, produce intermediate results, and present those results as mantissa product 250, product exponent 252, and combined sign 254. Streaming operand registers 220*a* and stationary operand registers 220*b* may correspond to the similarly named banks shown in FIG. 1, and may provide the same roles and access patterns, with register indices updated to match FIG. 2. In some embodiments compute circuitry 230 may correspond to the compute circuitry depicted in FIG. 1 and may be integrated with the same surrounding alignment, sign handling, accumulation, and normalization stages. The view in FIG. 2 may focus on the internal blocks that prepare floating-point products and related metadata before alignment.

Compute circuitry 230 may include a mantissa multiplier 232, an exponent adder 234, and a sign combiner 236 arranged so that the mantissa path and the exponent path proceed in parallel while sign information is prepared for downstream use. Streaming operand registers 220*a* and stationary operand registers 220*b* may each present an operand that includes a sign field, an exponent field, and a mantissa field when the engine operates in floating-point mode. The mantissa fields may feed mantissa multiplier 232. The exponent fields may feed exponent adder 234 and the sign fields may feed sign combiner 236. For example, in some implementations these three sub paths may be deeply pipelined so that compute circuitry 230 may sustain a high issue rate. In other implementations these sub paths may share hardware resources across cycles to reduce area while still producing the same outputs for downstream alignment circuitry.

Mantissa multiplier 232 may multiply the mantissa fields of the streaming and stationary operands to form mantissa product 250. For example, a mantissa may include the significant portion of a floating-point number that may encode fractional magnitude relative to an implicit or explicit radix point. Mantissa multiplier 232 may support multiple precisions so the internal multiplier width may scale with the selected format. For example, when operating in an FP8 format, mantissa multiplier 232 may accept two 3 bit or 4-bit mantissas depending on the specific FP8 variant in use and may produce a product with a width that preserves guard bits for later rounding. When operating in an FP6 format, mantissa multiplier 232 may accept shorter mantissas and may gate unused partial product generators to save energy. Mantissa multiplier 232 may be implemented using array multipliers, Booth encoding, or tree-based reduction, and may include carry save stages so that the latency remains suitable for the pipeline depth of compute engine 110. For example, a carry save stage may include a compressor that may accept three or more input rows and may produce two output rows without immediate carry propagation so that the final carry propagate addition may occur once at the end of the reduction. For example, Booth encoding may include a recoding of a multiplier operand that may generate signed partial products to lower the number of partial products that the multiplier may sum. For example, radix-4 Booth recoding may examine overlapping three-bit windows of the multiplier to select multiplicand multiples of −2, −1, 0, +1, or +2 so that the partial-product count may be roughly halved relative to a plain radix-2 implementation, which may reduce tree depth and switching for a given precision. For example, tree-based reduction may include a partial-product compression network that may combine many partial products into two rows that a final carry-propagate adder may sum. Examples may include Wallace-style trees, Dadda-style trees, or carry-save adder trees arranged to minimize logic depth while preserving throughput at the selected precision.

For example, mantissa multiplier 232 may incorporate product conditioning that may preserve subnormal behavior by enforcing a defined bit position after the radix point using a bitwise operation. In other embodiments mantissa multiplier 232 may omit that conditioning when inputs may be flushed to zero according to a selected numeric policy. For example, flush to zero may include treating values that would otherwise be represented as subnormals as zero at the input, at intermediate stages, or at the output, which may simplify alignment and normalization and may reduce latency. For example, a selected numeric policy may include a configuration that may govern behaviors such as subnormal handling, rounding choice, saturation choice, and exception signaling for a given mode and precision, and may be selected by firmware or by control fields of the processing system. Mantissa product 250 may be forwarded to the alignment stage so that the product can be positioned according to product exponent 252.

Exponent adder 234 may combine the exponent fields of the streaming and stationary operands to form product exponent 252. For example, an exponent may include the scale field of a floating-point number that may determine the power-of-two weight applied to the mantissa. Exponent adder 234 may add the input exponents with a bias adjustment suitable for the active format so that the resulting product exponent 252 expresses the combined scale of the operands. For example, a bias adjustment may include adding or subtracting a constant that may reflect the exponent bias of the active floating-point format so that exponent addition may yield a correctly biased product exponent. For example, an active format may include the currently selected floating-point encoding, including its exponent-bit width, mantissa-bit width, presence of a hidden leading one, and exponent bias (for example FP8 variants with different biases). Exponent adder 234 may also compute or stage auxiliary information such as carry out, overflow indication, or underflow indication that later contributes to exponent correction in the normalization stage. For example, carry out may include a carry produced by the most significant stage of exponent addition that may indicate that an extra increment of the unbiased exponent occurred and that normalization logic may need to absorb. For example, overflow indication may include a condition that may assert when a computed exponent exceeds the maximum representable exponent of the active format after biasing or correction. For example, underflow indication may include a condition that may assert when a computed exponent is below the minimum representable exponent of the active format after biasing or correction. For example, staging auxiliary information may include latching or forwarding these side-band flags alongside product exponent 252 so that downstream normalization may act on them in step with the data.

For example, in some implementations exponent adder 234 may account for special cases such as zeros and subnormals by generating a mode-dependent correction value that downstream logic may apply. For example, zeros may include operands whose sign, exponent, and mantissa fields may encode the canonical zero for the active format. For example, subnormals may include nonzero mantissas encoded with an all-zero exponent that may represent magnitudes smaller than the smallest normalized value for the active format. For example, a mode-dependent correction value may include an offset or small lookup-derived constant that downstream logic may add to or subtract from a provisional exponent or shift amount to account for choices such as hidden-bit treatment, prealignment already performed in the pipeline, subnormal handling policy, or precision-specific guard-bit allocation.

Product exponent 252 may drive a power-of-two generator in the alignment path so that the mantissa product 250 is placed in the correct numeric position without relying on a general-purpose shifter.

Sign combiner 236 may determine combined sign 254 based on the sign fields of the input operands. For example, a sign bit may include a one-bit indicator of a number's polarity. For multiplication the combined sign 254 may be the logical exclusive or of the input sign bits so that a negative times a positive may yield a negative and like signed inputs may yield a positive. Sign combiner 236 may also generate side information that assists in downstream handling of zeros or saturated values, for example by noting whether either input is zero according to the selected format. For example, combined sign 254 may be staged for use in normalization so that rounding and zero flush behaviors may remain consistent with the overall representation policy. In other embodiments combined sign 254 may participate in an early correction path for integer mode so that two's complement handling in the sign handling circuitry may be simplified.

The outputs of compute circuitry 230 may be consumed by the alignment and sign paths described in FIG. 1. Mantissa product 250 may feed a selection network that positions the mantissa bits according to product exponent 252 in floating-point mode. Combined sign 254 may either accompany the aligned mantissa into accumulation or may be held for use in a later normalization step depending on the configuration. In integer mode compute circuitry 230 may be quiesced or partially bypassed so that the selection fabric uses bitwise inputs from the streaming path to realize integer multiplication while sign combiner 236 continues to track polarity for pre accumulation correction. This behavior may allow the same compute circuitry to support both floating-point and integer workflows while keeping the hardware footprint compact.

To illustrate operation, consider a vector matrix multiplication where streaming operand registers 220*a* present a vector element x[i] and stationary operand registers 220*b* present a matrix element w[j,i]. Compute circuitry 230 may form mantissa product 250 as the product of the mantissas of x[i] and w[j,i]. Exponent adder 234 may produce product exponent 252 as the sum of the exponents of x[i] and w[j,i] adjusted by the format bias. Sign combiner 236 may produce combined sign 254 by combining the input signs. These three outputs may then move to alignment so that the mantissa product 250 is positioned according to product exponent 252, after which the aligned values may flow into accumulation toward a dot product result. This division of labor may keep cycle time predictable and may allow independent scaling of mantissa width and exponent width as precisions change under control of the processing system.

For example, mantissa multiplier 232 may include partial product gating so that only the subset of partial products needed for a given precision is active. Exponent adder 234 may include a carry save pre adder that prepares exponent sums for fast correction in normalization. Sign combiner 236 may feed a small lookup that records special cases for later handling, for example when either operand is zero or subnormal in the active format. These options may provide flexibility across different numeric policies while preserving the same interface of mantissa product 250, product exponent 252, and combined sign 254.

Figure 3:
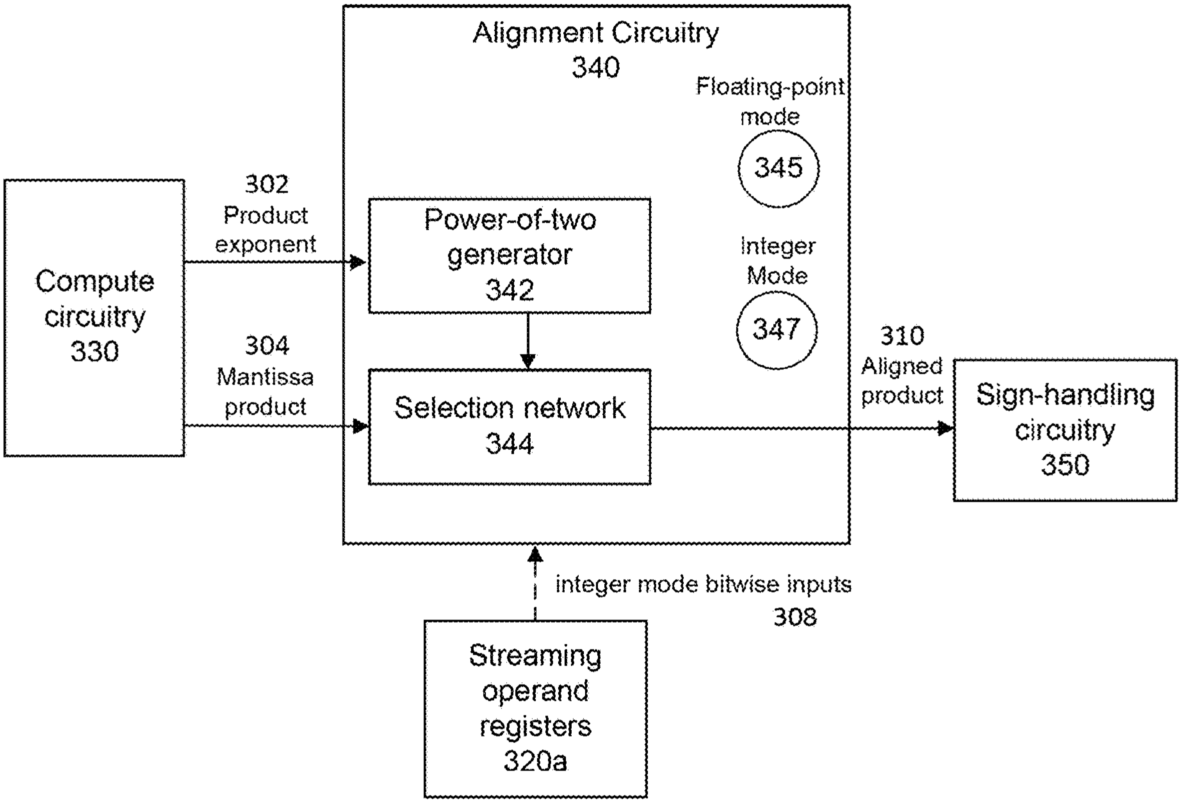
FIG. 3 illustrates an example block diagram of alignment circuitry that includes a power-of-two generator driven by a product exponent and a selection network that aligns a mantissa product in floating-point mode and receives integer mode bitwise inputs to produce an aligned product, in accordance with some aspects of the present technology.

FIG. 3 illustrates an example arrangement in which alignment circuitry 340 may receive a product exponent 302 and a mantissa product 304 from compute circuitry 330 and may produce an aligned product 310 for delivery to sign-handling circuitry 350. Compute circuitry 330 may correspond to the compute circuitry described for FIG. 1 and FIG. 2, and streaming operand registers 320*a* may correspond to the streaming operand registers described for FIG. 1, with numbering updated to match FIG. 3. A dotted input path labeled integer mode bitwise inputs 308 from streaming operand registers 320*a* into alignment circuitry 340 may indicate a mode-dependent or optional path that is used when integer mode is selected. For example, a mode-dependent path may include circuitry that may be active only when a control setting selects a particular operating mode.

Alignment circuitry 340 may provide exponent-guided positioning of mantissa product 304 in floating-point mode and may provide routing for integer bitwise multiplication in integer mode using largely the same hardware fabric. Alignment circuitry 340 may include a power-of-two generator 342 and a selection network 344. Power-of-two generator 342 may receive product exponent 302 and may produce a set of mutually exclusive control lines that represent a power-of-two value. For example, power-of-two generator 342 may include decode, lookup, or combinational logic that may map an exponent E to one or more control lines that may represent 2 raised to E. For example, power-of-two generator 342 may be implemented as an address decoder sized for the maximum exponent range of the selected precision so that only one control line is asserted per cycle, which may reduce switching and may simplify downstream timing. For example, a format whose product exponent spans up to thirty may use a five-bit input to assert one of thirty or thirty-two control lines that each correspond to a distinct placement of mantissa bits. In other formats with smaller exponent ranges, fewer control lines may be generated and unused logic may be gated off based on the precision selected by the processing system described for FIG. 1.

Selection network 344 may receive mantissa product 304 and the control lines from power-of-two generator 342 and may form aligned product 310 by placing the mantissa bits in positions that correspond to the power-of-two shift implied by product exponent 302. For example, selection network 344 may include a set of multiplexers, crossbars, or equivalent routing elements that may move a bit field or partial product into defined bit positions without requiring a general-purpose arithmetic shifter. For example, a general-purpose arithmetic shifter may include a variable-shift unit that may shift a word left or right by an amount supplied at run time (for example a barrel shifter or iterative shifter), typically supporting sign-extending right shifts and zero-extending left shifts across a range of bit positions.

In floating-point mode selection network 344 may be driven by the power-of-two control so that mantissa product 304 is positioned prior to reduction. For example, positioned prior to reduction may include placing bits of a value into significance correct locations before the value enters an adder tree or other compressor so that subsequent reduction adds numerically aligned quantities without further shifting. For example, reduction may include combining multiple inputs (for example partial products) into fewer sums using compressor networks or adder trees that may avoid full carry propagation until a final stage.

In integer mode selection network 344 may be driven by integer mode bitwise inputs 308 so that the same routing fabric realizes bitwise multiplication of integer operands by selecting, masking, or replicating stationary bits based on streaming bits. For example, integer mode bitwise inputs 308 may include one or more bit lanes sourced from streaming operand registers 320*a* that may act as control inputs into the selection network 344 so that partial products are formed by controlled routing rather than by a separate multiplier unit. This reuse of selection network 344 across modes may reduce area and may allow precision-based gating so that fewer multiplexers toggle when a smaller format is selected.

Floating-point mode 345 may be a control state in which alignment circuitry 340 treats product exponent 302 as the driver of placement and treats mantissa product 304 as the payload to be positioned. In this mode power-of-two generator 342 may assert a single control line that represents 2 raised to the product exponent, and selection network 344 may route mantissa product 304 into aligned positions that are consistent with that control line. For example, aligned product 310 may include a mantissa-domain value that may share a numeric alignment with other values that will be summed in the accumulation path. For example, if product exponent 302 indicates a shift of three, selection network 344 may place the mantissa product three positions toward more significant bits before the value enters sign-handling circuitry 350 and the accumulation path. In some embodiments floating-point mode 345 may also cause selection network 344 to attach guard bits or sticky bits that may support later rounding in normalization.

Integer mode 347 may be a control state in which alignment circuitry 340 treats bit slices of the streaming operand as selectors that drive selection network 344 to form integer partial products. In this integer mode bitwise inputs 308 from streaming operand registers 320*a* may be active, and selection network 344 may choose among stationary bits, shift them to appropriate positions, or gate them to zero based on the streaming bits. As one example, if an INT8 format is selected, eight-bit lanes from streaming operand registers 320*a* may act as enable controls that cause portions of selection network 344 to forward or suppress corresponding shifted versions of stationary operand bits so that a set of partial products is created. These partial products may then pass to the accumulation path described for FIG. 1 where parallel adder trees combine them efficiently. This behavior may allow integer multiplication to be realized without a dedicated barrel shifter and may allow the same routing resources to serve both floating-point and integer workflows. For example, a barrel shifter may include a combinational shifter that may shift a word by 0 through N−1 positions in a single cycle using a cascade of multiplexers, often sized to the word width N. For example, a k-shifted version may include a copy of a bit vector that may be shifted left by k bit positions (or right by k when specified) with zero fill unless the mode dictates sign extension.

Compute circuitry 330 may correspond to the compute stage shown in FIG. 2 and may produce product exponent 302 and mantissa product 304 when floating-point mode is active. Product exponent 302 may capture the combined scale of the input operands after bias handling, and mantissa product 304 may capture the raw significant-field product. These signals may be presented to alignment circuitry 340 in parallel so that power-of-two generator 342 can be prepared to control selection network 344 at the same time that mantissa product 304 arrives. In integer mode compute circuitry 330 may be idle for the mantissa and exponent paths or may bypass to reduce latency while sign information continues to be tracked for later use in sign-handling circuitry 350. This division of labor may keep cycle time predictable and may allow the same pipeline structure to operate across modes.

Sign-handling circuitry 350 may receive aligned product 310 and may prepare it for accumulation according to the active mode. In integer mode sign-handling circuitry 350 may apply two's-complement handling prior to reduction so that downstream adders operate on correctly signed values. In floating-point mode sign-handling circuitry 350 may pass sign information along or may combine it with aligned product 310 according to configuration so that subsequent normalization proceeds with consistent polarity. For example, two's-complement handling may include forming a representation of a negative value by bit inversion and increment under sign control so that later addition mirrors standard integer arithmetic.

Operation through FIG. 3 may be illustrated by two short, nonlimiting, examples. In a floating-point example, mantissa product 304 may equal the product of two input mantissas and product exponent 302 may equal the exponent sum with bias correction. Power-of-two generator 342 may assert the control line for 2 raised to E and selection network 344 may route mantissa product 304 into the aligned positions that correspond to that control line, producing aligned product 310 which then proceeds to sign-handling circuitry 350 and accumulation. In an integer example, streaming operand registers 320*a* may provide eight-bit lanes b0 through b7 as integer mode bitwise inputs 308 into selection network 344. For each k in 0 through 7, when bk is asserted, selection network 344 may route a k-shifted version of the stationary operand into the partial-product bundle that forms aligned product 310, and when bk is deasserted the corresponding path may route zeros. The set of routed values may then be summed by the accumulation circuitry described for FIG. 1.

Precision-aware behavior may be supported in alignment circuitry 340 so that the width of power-of-two generator 342 and the active subset of multiplexers in selection network 344 track the selected format. When a narrower format is chosen, fewer control lines may be generated and fewer selection elements may be enabled, which may reduce dynamic power. When a wider format is chosen, additional control lines and selection elements may be enabled to preserve numeric range. This precision-aware enablement may be coordinated by the processing system described for FIG. 1 so that alignment circuitry 340 remains consistent with the rest of the pipeline.

Figure 4:
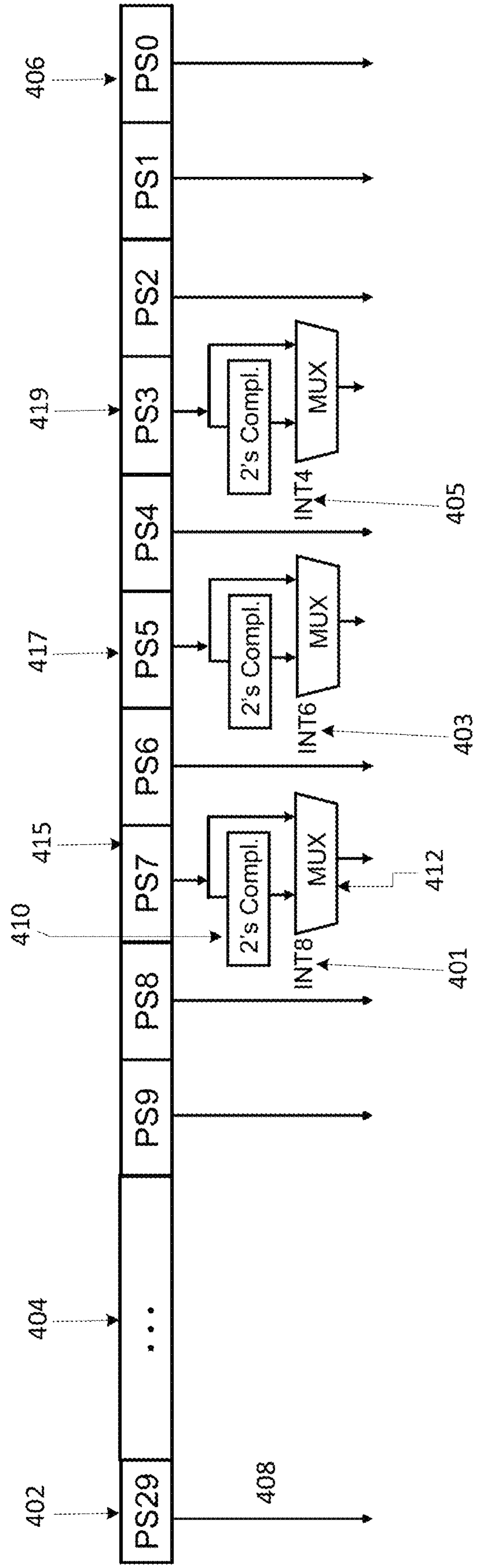
FIG. 4 illustrates an example block diagram of sign handling circuitry that applies two's complement correction for integer modes before accumulation, in accordance with some aspects of the present technology.

FIG. 4 illustrates an example arrangement that may apply sign correction before accumulation across a set of partial-sum lanes labeled PS0 through PS29. PS29 402 appears at the left edge and may represent the highest index lane in the illustrated span, while PS0 406 appears at the right edge and may represent the lowest index lane. The ellipse 404 between PS29 and PS9 may indicate that additional intermediate lanes are present even though not all lanes are drawn. Downward arrows 408 beneath the PS labels may indicate that each lane may provide a per-lane output toward downstream logic, and the same arrow style may be used for all lanes to show uniform egress behavior.

A two's complement unit 410 is drawn beneath PS7 415 with a MUX 412 directly beneath it and with a mode label INT8 401. The same pattern is drawn beneath PS5 417 with a mode label INT6 403 and beneath PS3 419 with a mode label INT4 405. This layout may show one way to place mode selectable sign correction at the most significant bit position for different integer precisions so that each precision group receives the appropriate pre accumulation handling. As one example, PSk may include a partial sum lane whose index k may correspond to a bit position within an integer group when the engine is in an integer mode. As one example, two's complement unit 410 may include logic that, when enabled by a mode and sign condition, may invert a subset of bits associated with a negative value and may add one to form a two's complement representation that is compatible with downstream addition. As one example, MUX 412 may include a selector that may choose between a pass through path and a corrected path based on the selected mode and sign condition.

For INT8 401, PS0 through PS7 may be treated as an eight bit group with PS7 415 acting as the group's most significant position. Two's complement unit 410 beneath PS7 415 may provide sign correction for that group. If the group sign indicates a non negative value, two's complement unit 410 may allow the eight lanes to pass unchanged through MUX 412. If the group sign indicates a negative value, two's complement unit 410 may invert lanes PS0 through PS7 and may apply an add one behavior so that the value forwarded by MUX 412 is in proper two's complement form for accumulation. For example, add one behavior may include the increment that follows a bitwise inversion during two's-complement formation, where the increment is applied within the active group width and any carry out beyond the group MSB is discarded or handled per the rounding/saturation policy in effect. For example, group sign may include a control value derived from the streaming operand or a preprocessed bit that indicates whether the integer value represented by the lanes in a group is negative or non negative. In some implementations the INT8 configuration may also enable signals to gate evaluation in lanes outside PS0 through PS7 so that switching activity tracks the chosen precision.

For INT6 403, PS0 through PS5 may be treated as a six bit group with PS5 417 acting as the most significant position. The two's complement unit 410 beneath PS5 417 may perform the same class of correction across six lanes rather than eight. MUX 412 beneath PS5 417 may then forward either the pass through or the corrected value toward the accumulation path. Placing the correction logic at PS5 417 may reduce carry distance during pre accumulation handling for six bit integers and may help keep cycle time consistent across modes. For example, carry distance may include the number of bit positions across which a carry may propagate in a given stage. Reducing carry distance at the pre-accumulation correction point may reduce worst-case delay and switching activity.

For INT4 405, PS0 through PS3 may be treated as a four bit group with PS3 419 acting as the most significant position. The two's complement unit 410 beneath PS3 419 may provide the correction across four lanes, and MUX 412 beneath PS3 419 may select between the pass through and corrected paths for that group. Because four bit values have a shorter width, enabling only the PS0 through PS3 lanes for correction and forwarding may further reduce switching in lanes that are not part of the active group.

Although FIG. 4 highlights PS7 415 for INT8 401, PS5 417 for INT6 403, and PS3 419 for INT4 405, the same pattern may be extended to other precisions or to wider groups. As one example, an INT2 mode may use PSi as the group most significant bit (MSB) and an INT10 mode may use PS9. Additional two's complement units 410 and MUXes 412 may be instantiated beneath the corresponding MSB positions for those groups, or a single configurable block may be repositioned logically by control signals so that the correction occurs at the appropriate lane index. As one example, the sign that drives two's complement unit 410 may be sourced from the streaming operand path described elsewhere and may be aligned in time with the partial sum lanes so that correction and selection occur in the same cycle as forwarding to the accumulation stage.

The downward arrows 408 drawn under each PS lane, including the arrow beneath PS29 402, may represent that each lane may provide an output to the next stage. This may include forwarding a corrected value selected by the MUX 412 for the active precision, forwarding a pass through value when no correction is needed, or holding a lane quiescent when the lane does not participate in the active precision group. As one example, pass-through value may include a lane value that is forwarded by MUX 412 unchanged, with no inversion or increment applied. As one example the outputs of the MUXes 412 may be gathered into bundles that may feed parallel adder trees in the accumulation circuitry so that integer partial products are reduced efficiently. The consistent arrow style across lanes may indicate uniform egress semantics even though two's complement unit 410 and MUX 412 are shown explicitly only at selected MSB positions for clarity.

An INT8 401 example may proceed as follows. Lanes PS0 through PS7 may carry the eight bit value to be accumulated. Two's complement unit 410 beneath PS7 415 may evaluate the group sign. If negative, the unit may invert PS0 through PS7 and may cause MUX 412 to forward the incremented result. If non negative, MUX 412 may forward the unmodified lanes.

An INT6 403 example may follow the same pattern with lanes PS0 through PS5 and the block beneath PS5 417. An INT4 405 example may involve lanes PS0 through PS3 and the block beneath PS3 419. This grouping approach may keep the location of sign correction aligned with the MSB of the active integer width so that the subsequent accumulation stage receives properly formed two's complement values without additional correction passes.

PS0 406 may be included to show the rightmost boundary of the illustrated span and may also mark the least significant lane for groups that begin at PS0. In other embodiments groups may be windowed or interleaved so that PS0 406 marks a local least significant lane for one group while other groups begin at higher indices. FIG. 4 may be read to encompass either arrangement, and the repeated placement of two's complement unit 410 and MUX 412 beneath PS7 415, PS5 417, and PS3 419 may be interpreted as a template that may generalize to any supported precision while keeping switching and area proportional to the selected mode.

Figure 5:
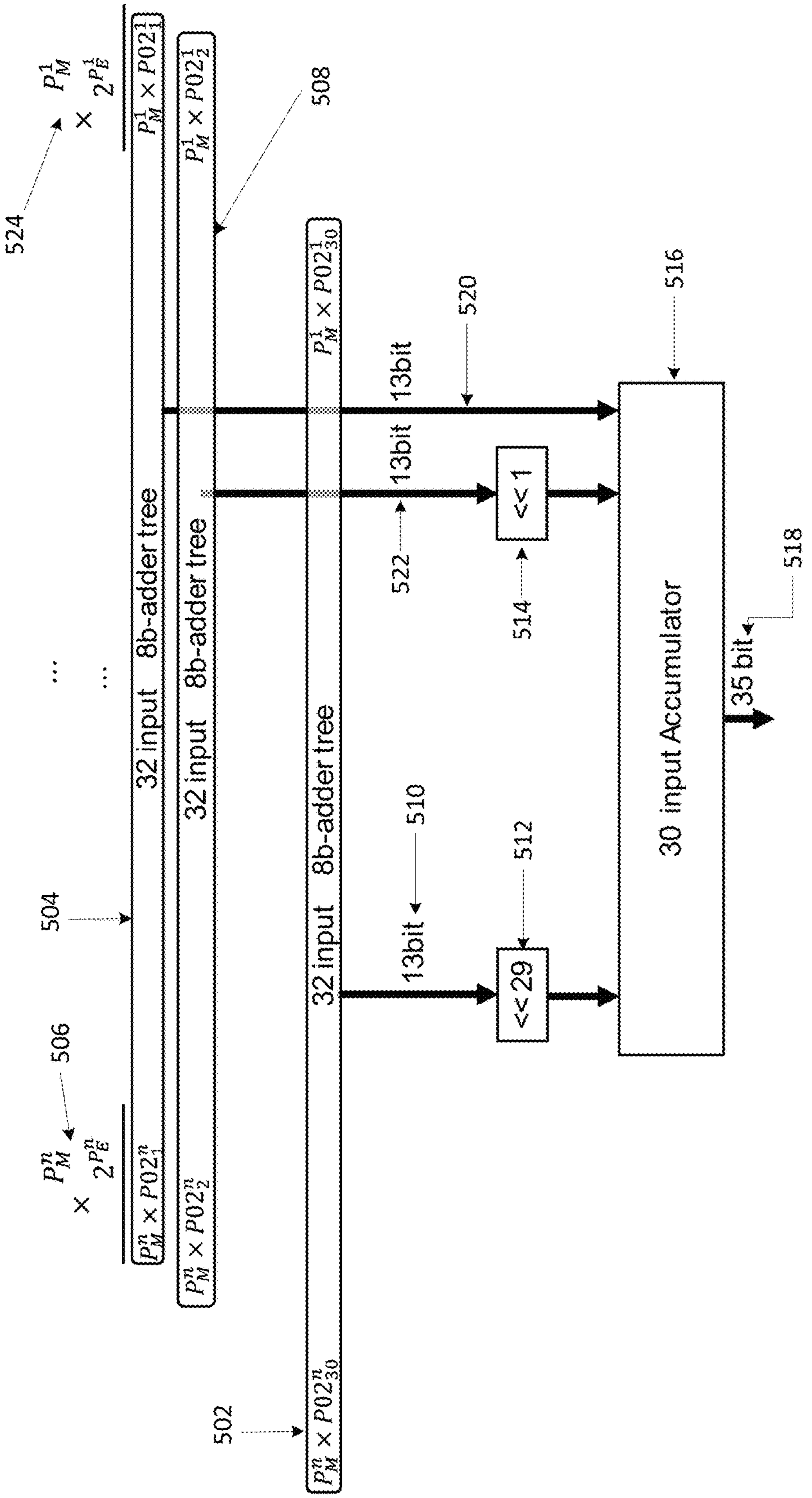
FIG. 5 illustrates an example block diagram of accumulation circuitry including parallel adder trees feeding a hierarchical output accumulator with selectable activation based on mode or precision, in accordance with some aspects of the present technology.

FIG. 5 illustrates an example accumulation arrangement in floating-point mode in which positioned products may flow through several 32-input 8b-adder trees into a multi-input accumulator. The upper adder tree 504, the middle adder tree 508, and the lower adder tree 502 may each be a 32-input, 8b-adder tree, and may each receive a bundle of inputs and may reduce those inputs to a local partial sum with short depth to support a high issue rate. As one example, a 32-input 8b-adder tree may include a reduction structure that accepts up to thirty-two lanes whose per lane width at tree entry is eight bits, and that may produce a wider local sum that reflects carries generated inside the tree.

The expressions 506 and 524 at the top may identify the form of a positioned product that a lane may contribute to the trees. The expression at 506 may be $$P_M^n \times 2^{P_E^n}.$$

The expression at 524 may be $$P_M^1 \times 2^{P_E^1}.$$

In some embodiments, $$P_M^n$$

may include a mantissa-domain product generated for lane n, and $$P_E^n$$

may reference the product exponent associated with that lane. The factor $$2^{P_E^n}$$

may represent a power-of-two placement value produced by a power-of-two generator as previously described, so each product may already carry the significance implied by the exponent before it reaches the tree inputs. In some embodiments the routing fabric may realize this placement using one-hot or mutually exclusive control lines rather than a barrel shifter.

Along each bar that may feed a tree, labels such as $$P_M^n \times 2P02_1^n,\ P_M^n \times 2P02_2^n,$$

and $$P_M^n \times 2P02_{30}^n,$$

may indicate that positioned contributions for lane n are organized into power-of-two bins across a range of significance. In some embodiments, $$P_M^n \times 2P02_k^n,$$

may include a specific power-of-two placement bin indexed by k for lane n. Different bins may feed different tree inputs so that contributions with different significance may be kept separate until the accumulator stage that understands their relative weight.

The three trees 504, 508, and 502 may forward their local sums to a 30 input Accumulator 516. Arrows 520 and 522 may show example local sum widths of 13 bits for two trees, and arrow 510 may show the same width for the lower tree. As one example, local sum width may include the bit width at a tree output that may include internal carry growth and guard space for later rounding. Two shift elements may appear on the outgoing paths. Block 514 may apply a left shift of one («1) to the 13-bit value on arrow 522, and block 512 may apply a left shift of twenty-nine («29) to the 13-bit value on arrow 510. These shifts may model placement offsets so that each tree's contribution may arrive at the 30 input Accumulator 516 at the intended weight. As one example, «k may include a logical left shift by k bit positions that repositions a word for weighted summation. The remaining arrow 520 may already be at the desired placement and may feed the accumulator without an additional shift.

The 30 input Accumulator 516 may combine one contribution per power-of-two position during each evaluation phase, where 30 input may describe the number of inputs rather than the width of any given input. The accumulator's output may be a 35-bit value 518, which may reflect growth needed to hold the sum of many positioned 13-bit contributors with room for carries and for later normalization. As one example, accumulator output width may include a bit width large enough to accommodate the dynamic range of the contributors plus guard space for rounding.

This organization may operate as a fused multiply and add datapath for floating-point operation. Mantissa products may be positioned by exponent-guided placement before or as they enter the trees, tree reduction may begin immediately, and only lightweight placement adjustments such as «1 and «29 may be applied on the way to the accumulator. This arrangement may reduce latency compared to designs that perform a general shift on every product before any reduction.

Variations may be used while keeping the same relationships among positioned inputs, tree reduction, and multi-input accumulation. In one variant, pairs of source rows may be summed locally before tree entry so that the per lane width at the tree inputs may be nine bits, the trees may be 32-input 9b-adder trees, and a 15-input accumulator may replace the 30-input accumulator. Placement adjustments may change to amounts such as «14 and «2 to match the spacing of the combined power-of-two bins. In another variant, the number of active trees and accumulator inputs may scale with the selected precision so that narrower formats may enable only the trees and positions they use, which may reduce switching while preserving accumulation semantics. In a further variant, an 8-input accumulator may be used when a kernel organizes the dot product so that only eight placement positions are populated during a given phase, and the local sum width labels and shift amounts may be tuned to that configuration.

In one nonlimiting example, positioned products associated with higher significance may enter the upper adder tree 504 and may produce a 13-bit local sum that may feed the accumulator along arrow 520. Products near the median significance may enter the middle adder tree 508 and may emit a 13-bit local sum along arrow 522 that may be left shifted by one in block 514 before entering the 30 input Accumulator 516. Products at the lowest significance may enter the lower adder tree 502, may emit a 13-bit local sum along arrow 510, may undergo a left shift by twenty-nine in block 512, and may then enter the accumulator. The accumulator may collect all contributions at their intended weights and may produce a 35-bit value 518 that is ready for normalization.

Figure 6:
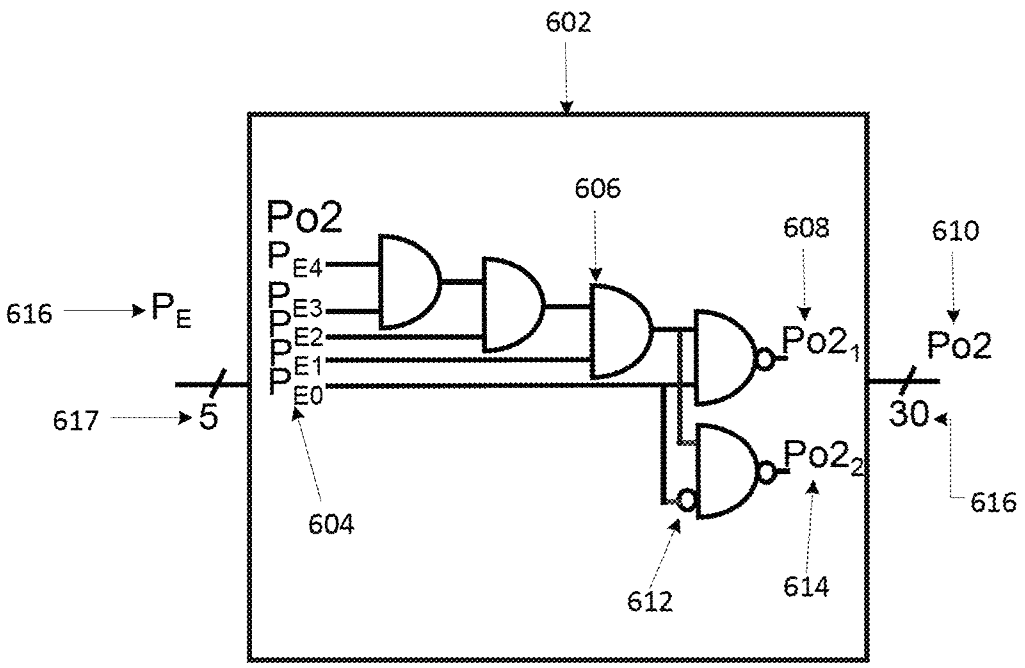
FIG. 6 illustrates an example block diagram of a power-of-two generator that decodes exponent bits to produce mutually exclusive control lines for exponent based alignment, in accordance with some aspects of the present technology.

FIG. 6 illustrates an example power-of-two (Po2) logic unit 602 that may generate mutually exclusive control lines based on an input exponent and may drive selection elements that position mantissa products as described for earlier figures. Product exponent bus 616 may be labeled as $P_E$. The small 5 617 next to the input may indicate an example bit width of five bits. As one example, product exponent bus 616 may include a binary field that encodes the product exponent for a given lane or cycle, and a 5 bit width may allow up to thirty-two encoded values in a non-limiting example. FIG. 6 shows individual exponent bit wires $P_{E4}$ through $P_{EO}$ called out at 604 to emphasize that the logic within Po2 logic unit 602 may consume the exponent in bit form to realize a decode. As one example, realizing a decode may include implementing the combinational mapping from an encoded exponent field to one hot control lines, whether with gate level logic (for example AND/NAND/NOR networks with mixed polarity inputs) or with a memory based lookup structure that outputs exactly one asserted line for each valid input code. For example, one hot bus may include a set of control lines in which at most one line is asserted for any valid input code, allowing routing based placement without a general purpose shifter.

Within Po2 logic unit 602, a sequence of combinational gates may form minterms of the exponent bits. Logic gate 606 may represent a multi input logic operator that combines selected exponent bit polarities to produce an intermediate decode term. As one example, intermediate decode term may include a partial product of literals expression produced in an early decode stage that represents a subset of input bit conditions. The term may be combined with other intermediate terms to form a minterm or to drive a small fan in gate that asserts a specific Po2 line. As one example, minterm may include a product term that is true for exactly one encoded input pattern, which may be used to realize a one hot decode of the exponent field. The small open circles drawn at some gate inputs and outputs, such inverter 612, may denote logical inversion. As one example, inversion may include a logical complement of a signal level so that a gate can be configured to test for either a zero or a one on a particular exponent bit without adding extra discrete inverters. Using mixed polarity inputs may allow the Po2 logic unit 602 to implement minterms efficiently with a modest number of gates.

The outputs labeled $Po2_1$ 608 and $Po2_2$ 614 may illustrate two representative one-hot control lines produced by the decode network. In some embodiments, $Po2_k$ may include a single control line that is asserted when $P_E$ encodes the integer k, where the assertion of $Po2_k$ may indicate selection or placement consistent with a factor of $2^k$. In operation, if the exponent field $P_E$ equals binary 00011, $Po2_3$ may assert while all other Po2 outputs remain deasserted. If $P_E$ equals binary 11110, $Po2_{30}$ may assert while others remain low, provided the supported range extends to that position. The figure's labeling of $Po2_1$ 608 and $Po2_2$ 614 is intended to be illustrative and nonlimiting to show that distinct exponent values may map to distinct control outputs.

The right side of FIG. 6 shows an aggregated Po2 bus at 610 next to product exponent bus 616. This annotation may indicate that Po2 logic unit 602 may produce up to thirty mutually exclusive control lines $Po2_1$ 608 through $Po2_{30}$ in the depicted configuration. As one example, one hot bus may include a collection of control wires in which at most one wire is asserted for any valid input code so that downstream selection networks may route or position data without performing arithmetic shifts. In some implementations the count of available Po2 lines may be less than or greater than thirty depending on the numeric format range, and unused decode terms may be gated off to reduce switching.

The gate shapes within Po2 logic unit 602 may be read as examples rather than strict requirements. In one embodiment the logic gate 606 may be implemented with AND gates that receive true and complemented versions of the exponent bits $P_{E4}$ through $P_{EO}$, with the complements formed inverter 612. In another embodiment the same decode may be realized with NAND-NOR combinations so that fan-in and loading are balanced across stages. In yet another embodiment the Po2 decode may be realized by a small lookup structure whose address is $P_E$, where each address entry may assert exactly one of the Po2 outputs. In some embodiments, Po2 logic unit 602 may include any circuitry that, given an input exponent bus, may assert one of many mutually exclusive control lines that correspond to powers of two for positioning and selection.

Timing and precision behavior may be coordinated with other blocks. Po2 logic unit 602 may be pipelined so that its outputs $Po2_k$ align with the arrival of the associated mantissa product at the selection network. The number of active outputs may scale with the selected precision so that fewer decode terms are evaluated for narrower formats. In integer mode the decode outputs may be held quiescent while the same selection fabric reuses its routing resources to implement bitwise multiplication, and in floating-point mode the Po2 outputs may be the primary drivers of alignment.

For example, assume a 5-bit exponent bus $P_E$ at product exponent bus 616 carries binary 00101. Inside Po2 logic unit 602, the logic gate 606 may test for $P_{E2}$, $P_{EO}$=1, and the remaining bits at zero with the help of inverter 612. The resulting minterm may assert $Po2_5$, while all other Po2 lines, such as $Po2_1$ 608 and $Po2_2$ 614, may remain deasserted. The aggregated Po2 bus 610 may present a one-hot vector with only the line for position five asserted, and the downstream selection network may use that line to place a mantissa product into bit positions that correspond to a factor of $2^5$. If on a later cycle $P_E$ equals 00001, $Po2_1$ 608 may assert instead, which may shift the placement by one position relative to the previous example.

Layout and electrical choices may vary. Po2 logic unit 602 may employ staged buffering so that long Po2 wires present uniform edge rates across the array, and the decode may be partitioned so that nearby Po2 lines share logic to reduce area. As one example, staged buffering may include inserting one or more buffer stages along a control or data path so that fan-out and wire length are divided across shorter segments. This may improve edge rate, reduce skew, and maintain timing uniformity across the Po2 outputs as they traverse the selection fabric. In some implementations the unit may expose scan or test points so that each Po2 output can be observed or forced during verification. These implementation options may be incorporated without changing the functional role of Po2 logic unit 602 as the producer of one hot power of two control used by the alignment fabric.

Figure 7:
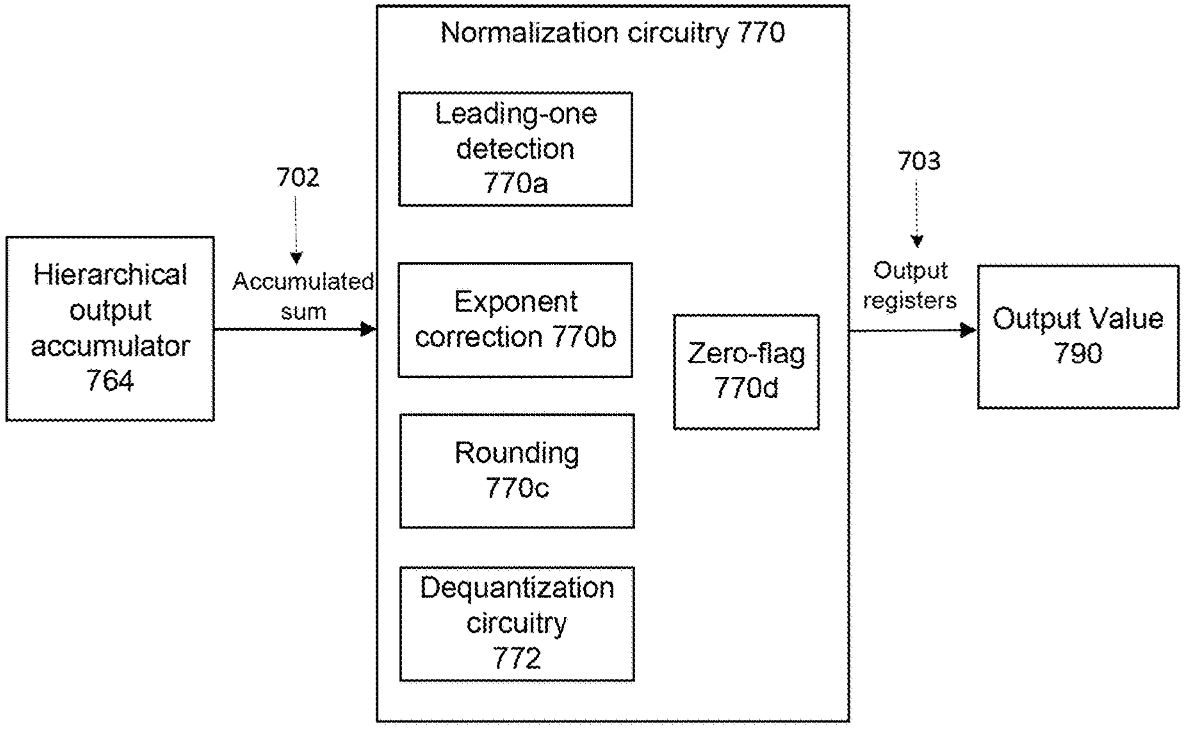
FIG. 7 illustrates an example block diagram of normalization circuitry that performs leading one detection, exponent correction, rounding, and zero flushing while integrating dequantization within the exponent path, in accordance with some aspects of the present technology.

FIG. 7 illustrates an example in which a hierarchical output accumulator 764 may produce an accumulated sum 702 that may be provided as an input to normalization circuitry 770 and then, after formatting, may be written through accumulated sum 702 into output registers 703 as an output value 790. As one example, accumulated sum 702 may include a wide intermediate value that may result from combining many aligned contributions with enough guard width to support later rounding and any exponent adjustment. In another example, guard width may include the additional bit-width retained in the intermediate (pre-normalized) sum beyond the final output width to accommodate carry growth, rounding (including guard/round/sticky information), and exponent-related shifts during normalization without overflow or loss of significance.

Normalization circuitry 770 may convert accumulated sum 702 into the selected numeric output format so that downstream consumers see stable range and rounding behavior. Leading-one detection 770*a* may determine the position of the most significant set bit within accumulated sum 702. In one implementation, leading-one detection 770*a* may include logic that scans accumulated sum 702 from the most significant side and may produce an index that indicates where the first one occurs. In a floating-point example this index may define how far the mantissa should shift so that a single one appears at the head of the significand window. In an integer example the same index may be used to form a derived exponent when the output is to be emitted as a floating style value.

Exponent correction 770*b* may form or adjust the exponent that accompanies the mantissa after the shift implied by leading-one detection 770*a*. In one implementation, exponent correction 770*b* may include computing an exponent from the position index together with a mode-dependent correction term so that the final exponent may fall within the representable range for the target format. In a floating-point example exponent correction 770*b* may add a bias and may subtract a pipeline constant to account for earlier alignment. In an integer example exponent correction 770*b* may set the exponent equal to the index from leading-one detection 770*a* when accumulated sum 702 is interpreted in a floating style representation, or may present a shift amount when a fixed-point representation is selected.

Rounding 770*c* may apply a configured rounding behavior to the mantissa portion formed from accumulated sum 702. In one implementation, rounding 770*c* may include operations such as truncate, round-to-nearest, or round-to-even that may be selected by configuration. Rounding 770*c* may consume guard and sticky information carried alongside accumulated sum 702 so that tie and halfway cases are handled in a defined way. For example, if the bit just below the mantissa cutoff is one and any lower bit is one, rounding 770*c* may increment the mantissa under round-to-nearest. If lower bits are all zero and the cutoff bit is one, rounding 770*c* may increment only when round-to-even is selected.

Dequantization circuitry 772 may incorporate scale information into the exponent or shift path so that quantized workflows may produce numerically scaled outputs without a separate post-processing step. In one implementation, dequantization circuitry 772 may include logic that receives per tensor or per operand scale values and may combine them with the exponent produced by exponent correction 770*b*. In a microscaling example, dequantization circuitry 772 may add an offset derived from stationary and streaming scales to the output exponent so that the final value reflects the intended scale.

Zero-flag 770*d* may monitor accumulated sum 702 and intermediate results and may force a canonical zero at the output when the value is identically zero. In one implementation, zero-flag 770*d* may include a condition that is asserted when accumulated sum 702 and any guard information indicate that normalization would produce an all zero mantissa and an exponent that should be driven to the zero representation for the active format. When zero-flag 770*d* is asserted, normalization circuitry 770 may suppress exponent and mantissa updates and may emit the defined zero pattern.

After these operations the output of normalization circuitry 770 may pass through accumulated sum 702 into output registers 703 and may be presented as output value 790. In one implementation, output registers 703 may include storage elements that present a stable interface to subsequent blocks and may support double buffering or handshake protocols to sustain throughput. In a floating-point example hierarchical output accumulator 764 may provide accumulated sum 702 with sufficient guard width, normalization circuitry 770 may detect the leading one, may apply exponent correction 770*b* and rounding 770*c*, may fuse any scale values through dequantization circuitry 772, may act on zero-flag 770*d* when appropriate, and may write the result through the output registers 703 as output value 790. In an integer example hierarchical output accumulator 764 may again provide accumulated sum 702, normalization circuitry 770 may convert that value into a floating style or fixed-point representation according to configuration, and output value 790 may be registered for downstream use.

Figure 8:
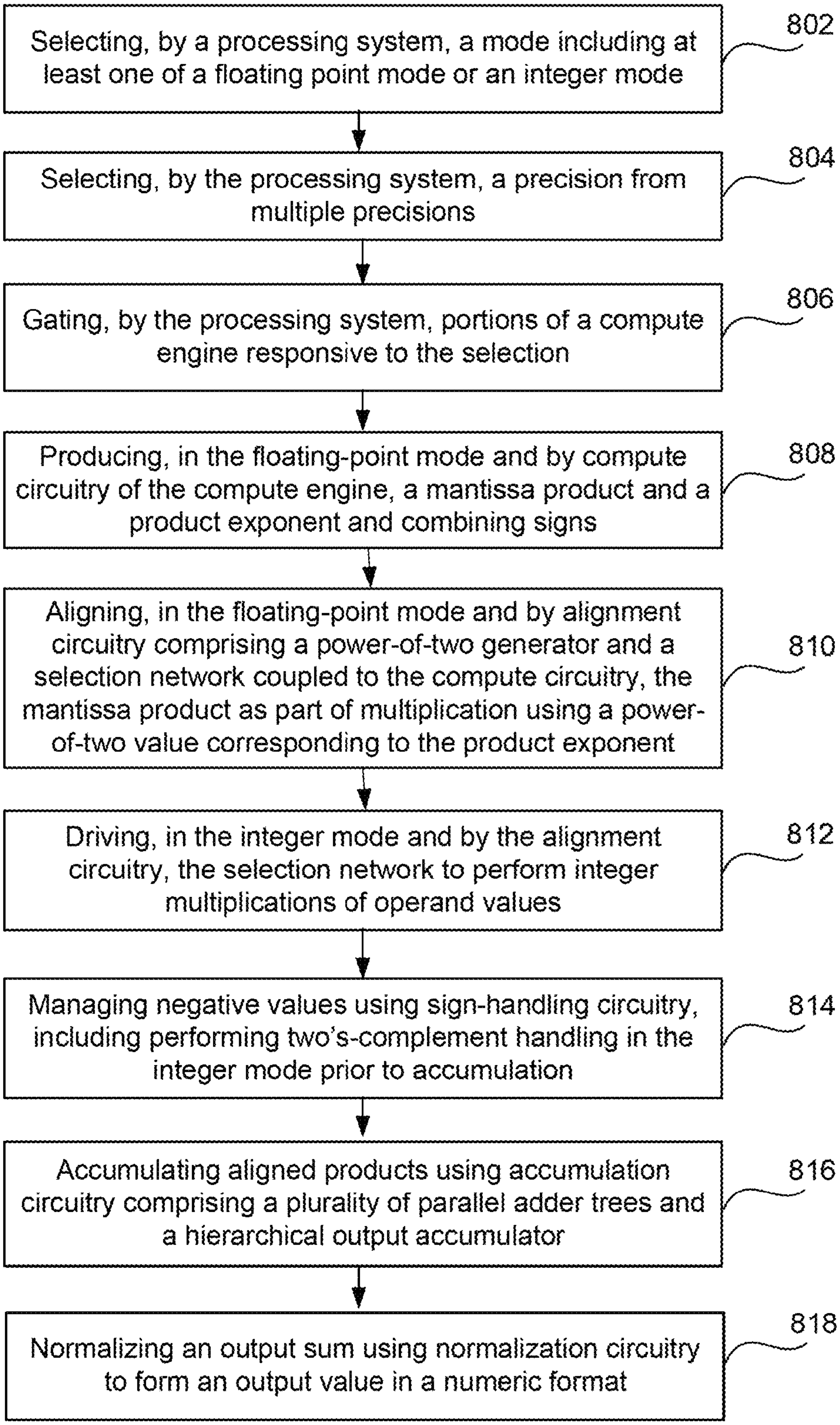
FIG. 8 illustrates an example flowchart of a method that includes selecting a mode, selecting a precision, gating compute resources, generating floating-point products, aligning products with a power-of-two driven selection network, performing integer multiplications via the selection network, handling signs, accumulating partial sums, and normalizing an output value, in accordance with some aspects of the present technology.

FIG. 8 illustrates an example method flowchart that may begin with step 802 in which a processing system selects a mode that may include a floating-point mode or an integer mode. In one example, mode may include a configuration that determines how operands are interpreted and how downstream circuitry behaves, where floating-point mode may use sign, exponent, and mantissa fields and integer mode may use two's-complement integer words.

After step 802, the flowchart may move to step 804 in which the processing system selects a precision from multiple precisions. In one example, precision may include the number of bits allocated to a floating-point mantissa and exponent or the number of bits in an integer word, and example precisions may include FP8, FP6, FP4, INT8, INT6, and INT4. Selecting a precision may set internal data widths and may determine which sub-blocks are enabled in later steps.

At step 806 the processing system may gate portions of a compute engine responsive to the selections made in steps 802 and 804. In one example, gating may include selectively enabling or disabling logic or memory elements so that switching activity and sometimes leakage scale with the active data width and with the functions that are in use. Gating may be applied to multiplier slices, selection fabrics, adder trees, accumulator stages, and normalization elements so that energy tracks the workload.

At step 808, when floating-point mode is active, compute circuitry of the compute engine may produce a mantissa product and a product exponent and may combine signs. In one example, a mantissa product may include the product of input mantissas formed by a mantissa multiplier, product exponent may include an exponent value produced by exponent addition or an equivalent computation that represents the scale of the product, and combined sign may include a polarity bit derived from the input signs. These three values may proceed in parallel toward alignment and sign handling.

At step 810, still in floating-point mode, alignment circuitry that includes a power-of-two generator and a selection network coupled to the compute circuitry may align the mantissa product as part of multiplication using a power-of-two value corresponding to the product exponent. In one implementation power-of-two generator may include decode or lookup logic that, given a product exponent, may assert one of many mutually exclusive control lines that may correspond to and/or represent a power-of-two value 2^(E_prod), where E_prod is the product exponent. In one implementation, selection network may include multiplexers or a routing fabric that may place the mantissa product into bit positions implied by the asserted power-of-two line so that the product may enter reduction at the correct significance. This placement may be realized by routing rather than a general shifter.

At step 812, when integer mode is active, the alignment circuitry may drive the selection network to perform integer multiplications of operand values. In this case, the selection network may use bitwise inputs from the streaming operand path as controls so that shifted copies of the stationary operand may be routed or suppressed, which may form integer partial products without a separate barrel shifter. Reusing the same selection fabric for both floating-point placement and integer partial-product formation may keep the datapath compact and may simplify gating by precision.

At step 814 the method may manage negative values using sign-handling circuitry, including performing two's-complement handling in the integer mode prior to accumulation. In one implementation, two's-complement handling may include inverting the relevant value bits and adding one for groups whose sign indicates a negative number so that downstream addition uses standard integer addition rules. In floating-point mode sign information may be carried alongside the aligned mantissa and may be applied according to the selected representation.

At step 816 the flowchart may accumulate aligned products using accumulation circuitry that comprises a plurality of parallel adder trees and a hierarchical output accumulator. In one implementation, adder tree may include a network of small adders that reduces many inputs to a local sum with low depth, and hierarchical output accumulator may include one or more stages that combine the local sums across positions or phases to form an accumulated sum with sufficient guard width for normalization. The number of active trees and accumulator inputs may scale with the precision selected at step 804.

At step 818 the method may normalize an output sum using normalization circuitry to form an output value in a numeric format. In one implementation normalization circuitry may include logic that may include leading-one detection to find a shift amount, exponent correction that may add a mode-dependent correction and any format bias, rounding that may implement truncate, round-to-nearest, or round-to-even policies, dequantization that may fuse per-operand or per-tensor scales into the exponent or shift path when present, and a zero-flag path that may force a canonical zero when the sum is identically zero. The normalized value may then be registered and may be made available as the final output of the method.

In some embodiments, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

A number of implementations have been described. Nevertheless, it will be understood that various modifications may be made without departing from the spirit and scope of the disclosure. Accordingly, other implementations are within the scope of the following claims.

It is understood that the described systems or apparatuses are not mutually exclusive, and elements, components, materials, or steps described in connection with one example method, system, or apparatus may be combined with, or eliminated from, other disclosed methods, systems, or apparatuses in suitable ways to accomplish desired design objectives.

In the foregoing specification, the disclosed systems or apparatuses have been described with reference to numerous specific details that can vary from implementation to implementation. Certain adaptations and modifications of the described systems or apparatuses can be made. Various renditions of the disclosed systems or apparatuses can be apparent to those skilled in the art from consideration of the specification and practice of the invention disclosed herein. It is intended that the specification and examples be considered as exemplary only.

Aspect I: A computing system including:

a processing system including one or more processors; and a compute engine coupled to the processing system, the processing system configured to select a mode including at least one of a floating-point mode or an integer mode;

select a precision from multiple precisions; and gate portions of the compute engine responsive to the selection;

the compute engine including operand registers for operand values;

compute circuitry configured, in the floating-point mode, to produce a mantissa product and a product exponent and to combine signs;

alignment circuitry including a power-of-two generator and a selection network coupled to the compute circuitry and configured (a) in the floating-point mode, to align the mantissa product as part of multiplication using a power-of-two value corresponding to the product exponent, and (b) in the integer mode, to drive the selection network to perform integer multiplications of operand values;

sign-handling circuitry configured to manage negative values including two's-complement handling in the integer mode prior to accumulation;

accumulation circuitry including a plurality of parallel adder trees and a hierarchical output accumulator; and normalization circuitry configured to form an output value in a numeric format.

Aspect II: The system of Aspect I, wherein the operand registers include streaming operand registers and stationary operand registers.

Aspect III: The system of any of Aspects I-II, wherein exponent alignment during multiplication is performed by the alignment circuitry, the alignment circuitry including a power-of-two generator driving the selection network to align the mantissa product based on the product exponent.

Aspect IV: The system of any of Aspects I-III, wherein the power-of-two generator includes at least one of: an address decoder, a lookup table, or combinational logic configured to produce mutually exclusive control lines corresponding to a power-of-two value.

Aspect V: The system of any of Aspects I-IV, wherein the power-of-two value corresponds to 2 raised to the product exponent (2ˆE).

Aspect VI: The system of any of Aspects I-V, wherein responsive to the selected mode or the selected precision, portions of the plurality of parallel adder trees and of the hierarchical output accumulator are disabled.

Aspect VII: The system of any of Aspects I-VI, wherein the normalization circuitry is configured to perform one or more of: leading-one detection, compute an output exponent with a mode-dependent correction, apply rounding selected from truncate, round-to-nearest, round-to-even, or flush to zero responsive to a zero flag.

Aspect VIII: The system of any of Aspects I-VII, further including dequantization circuitry configured to fuse scale tensors and streaming operands into the output exponent, the dequantization circuitry being within the normalization circuitry.

Aspect IX: The system of any of Aspects I-VIII, wherein the compute circuitry includes mantissa-product logic configured to preserve subnormal values by enforcing a zero immediately after the radix point via a bitwise OR mechanism.

Aspect X: The computing system of any of Aspects I-IX, wherein the operand registers include stationary operand registers configured to store a matrix operand and streaming operand registers configured to store a vector operand, and wherein the compute circuitry performs a vector-matrix multiplication by multiplying elements of the vector operand by corresponding elements of the matrix operand and accumulating products to form dot-product results.

Aspect XI: The computing system of any of Aspects I-X, wherein selecting the precision includes selecting among at least a first floating-point precision, a second floating-point precision different from the first floating-point precision, and at least one integer precision, and wherein gating portions of the compute engine includes selectively enabling a subset of the plurality of parallel adder trees based on the selected precision.

Aspect XII: The computing system of any of Aspects I-XI, wherein the compute engine further includes multiplication multiplexers arranged to selectively route integer operand bits or integer partial products to the accumulation circuitry, and wherein, in the integer mode, driving the selection network includes controlling the multiplication multiplexers to implement an integer multiplication operation.

Aspect XIII: The computing system of any of Aspects I-XII, wherein, in the floating-point mode, the compute circuitry and the accumulation circuitry operate as a fused multiply-and-add datapath in which the mantissa product is aligned based on the product exponent.

Aspect XIV: The computing system of any of Aspects I-XIII, further including pre-output accumulator circuitry coupled between the plurality of parallel adder trees and the hierarchical output accumulator, the pre-output accumulator circuitry configured to condition partial sums prior to entry into the hierarchical output accumulator by applying sign correction.

Aspect XV: The computing system of any of Aspects I-XIV, wherein the hierarchical output accumulator includes a plurality of accumulator stages arranged to (i) accumulate partial sums across multiple evaluation phases and (ii) combine accumulated results from the plurality of accumulator stages to produce the output value.

Aspect XVI: A method including:

selecting, by a processing system, a mode including at least one of a floating-point mode or an integer mode;

selecting, by the processing system, a precision from multiple precisions;

gating, by the processing system, portions of a compute engine responsive to the selection;

producing, in the floating-point mode and by compute circuitry of the compute engine, a mantissa product and a product exponent and combining signs;

aligning, in the floating-point mode and by alignment circuitry including a power-of-two generator and a selection network coupled to the compute circuitry, the mantissa product as part of multiplication using a power-of-two value corresponding to the product exponent;

driving, in the integer mode and by the alignment circuitry, the selection network to perform integer multiplications of operand values;

managing negative values using sign-handling circuitry, including performing two's-complement handling in the integer mode prior to accumulation;

accumulating aligned products using accumulation circuitry including a plurality of parallel adder trees and a hierarchical output accumulator; and normalizing an output sum using normalization circuitry to form an output value in a numeric format.

Aspect XVII: The method of Aspect XVI, wherein the operand registers stage operand values and include streaming operand registers and stationary operand registers.

Aspect XVIII: The method of any of Aspects XVI-XVII, wherein exponent alignment during multiplication is performed by the alignment circuitry, the alignment circuitry including the power-of-two generator driving the selection network to align the mantissa product based on the product exponent.

Aspect XIX: The method of any of Aspects XVI-XVIII, wherein the power-of-two generator includes at least one of: an address decoder, a lookup table, and combinational logic configured to produce mutually exclusive control lines corresponding to a power-of-two value.

Aspect XX: The method of any of Aspects XVI-XIX, wherein the power-of-two value corresponds to 2 raised to the product exponent (2ˆE).

Aspect XXI: The method of any of Aspects XVI-XX, wherein only portions of the plurality of parallel adder trees and of the hierarchical output accumulator are enabled responsive to the selected mode or precision.

Aspect XXII: The method of any of Aspects XVI-XXI, wherein the normalization circuitry is configured to perform one or more of: leading-one detection, compute an output exponent with a mode-dependent correction, apply rounding selected from truncate, round-to-nearest, or round-to-even, and flush to zero responsive to a zero flag.

Aspect XXIII: The method of any of Aspects XVI-XXII, further including dequantizing by fusing scale tensors for stationary and streaming operands into the output exponent, the dequantization being performed within the normalization circuitry.

Aspect XXIV: The method of any of Aspects XVI-XXIII, wherein the compute circuitry includes mantissa-product logic configured to preserve subnormal values by enforcing a zero immediately after the radix point via a bitwise OR mechanism.

Aspect XXV: An apparatus including:

operand registers for operand values;

compute circuitry configured, in the floating-point mode, to produce a mantissa product and a product exponent and to combine signs;

alignment circuitry including a power-of-two generator and a selection network coupled to the compute circuitry and configured to:

in the floating-point mode, to align the mantissa product as part of multiplication using a power-of-two value corresponding to the product exponent and in the integer mode, to drive the selection network to perform integer multiplications of operand values;

sign-handling circuitry configured to manage negative values, including two's-complement handling in the integer mode prior to accumulation;

accumulation circuitry including a plurality of parallel adder trees and a hierarchical output accumulator; and normalization circuitry configured to form an output value in a numeric format.

Aspect XXVI: The computing system of any of Aspects I-XV, wherein the compute engine includes a compute-in-memory macro including one or more memory arrays, and at least a portion of the compute circuitry is integrated with the one or more memory arrays to perform multiply-accumulate operations using operand values read from the one or more memory arrays.

What is claimed is:

1. A computing system, comprising:

a processing system including one or more processors; and a compute engine coupled to the processing system, wherein the processing system is configured to:

select a mode from a floating-point mode or an integer mode;

select a precision from multiple precisions; and gate portions of the compute engine responsive to the selected mode and the selected precision; and the compute engine comprises:

operand registers for operand values;

compute circuitry configured, in the floating-point mode, to produce a mantissa product and a product exponent and to combine signs;

alignment circuitry comprising a power-of-two generator and a selection network coupled to the compute circuitry, the alignment circuitry being configured to:

in the floating-point mode, align the mantissa product as part of multiplication using a power-of-two value corresponding to the product exponent; and in the integer mode, drive the selection network to perform integer multiplications of the operand values;

sign-handling circuitry configured to manage negative values, including two's-complement handling in the integer mode prior to accumulation;

accumulation circuitry comprising a plurality of parallel adder trees and a hierarchical output accumulator; and normalization circuitry configured to form an output value in a numeric format.

2. The system of claim 1, wherein the operand registers comprise streaming operand registers and stationary operand registers.

3. The system of claim 1, wherein exponent alignment during the multiplication is performed by the alignment circuitry, the alignment circuitry comprising the power-of-two generator driving the selection network to align the mantissa product based on the product exponent.

4. The system of claim 1, wherein the power-of-two generator is an address decoder, a lookup table, or a combinational logic configured to produce mutually exclusive control lines corresponding to the power-of-two value.

5. The system of claim 1, wherein the power-of-two value is 2 raised to the product exponent (2^E).

6. The system of claim 1, wherein responsive to the selected mode or the precision, portions of the plurality of parallel adder trees and the hierarchical output accumulator are disabled.

7. The system of claim 1, wherein the normalization circuitry is configured to perform one or more of: leading-one detection, compute an output exponent with a mode-dependent correction, apply rounding selected from truncate, round-to-nearest, round-to-even, or flush to zero responsive to a zero flag.

8. The system of claim 7, further comprising:

dequantization circuitry configured to fuse scale tensors and streaming operands into the output exponent, the dequantization circuitry being within the normalization circuitry.

9. The system of claim 1, wherein the compute circuitry includes mantissa product logic configured to preserve subnormal values by enforcing a zero immediately after the radix point via a bitwise OR mechanism.

10. The computing system of claim 1, wherein the operand registers comprise stationary operand registers configured to store a matrix operand and streaming operand registers configured to store a vector operand, and the compute circuitry performs a vector-matrix multiplication by multiplying elements of the vector operand by corresponding elements of the matrix operand and accumulating products to form dot-product results.

11. The computing system of claim 1, wherein:

selecting the precision comprises selecting among at least a first floating-point precision, a second floating-point precision different from the first floating-point precision, and at least one integer precision, and gating the portions of the compute engine comprises selectively enabling a subset of the plurality of parallel adder trees based on the selected precision.

12. The computing system of claim 1, wherein the compute engine further comprises multiplication multiplexers arranged to selectively route integer operand bits or integer partial products to the accumulation circuitry, and in the integer mode, driving the selection network comprises controlling the multiplication multiplexers to implement an integer multiplication operation.

13. The computing system of claim 1, wherein: in the floating-point mode, the compute circuitry and the accumulation circuitry operate as a fused multiply-and-add datapath in which the mantissa product is aligned based on the product exponent.

14. The computing system of claim 1, further comprising:

pre-output accumulator circuitry coupled between the plurality of parallel adder trees and the hierarchical output accumulator, the pre-output accumulator circuitry being configured to condition partial sums prior to entry into the hierarchical output accumulator by applying sign correction.

15. The computing system of claim 1, wherein the hierarchical output accumulator comprises a plurality of accumulator stages arranged to:

accumulate partial sums across multiple evaluation phases, and combine accumulated results from the plurality of accumulator stages to produce the output value.

16. A method, comprising:

selecting, by a processing system, a mode from a floating-point mode or an integer mode;

selecting, by the processing system, a precision from multiple precisions;

gating, by the processing system, portions of a compute engine responsive to the selected mode and the selected precision;

producing, in the floating-point mode and by compute circuitry of the compute engine, a mantissa product and a product exponent and combining signs;

aligning, in the floating-point mode and by alignment circuitry comprising a power-of-two generator and a selection network coupled to the compute circuitry, the mantissa product as part of multiplication using a power-of-two value corresponding to the product exponent;

driving, in the integer mode and by the alignment circuitry, the selection network to perform integer multiplications of operand values;

managing negative values using sign-handling circuitry, including performing two's-complement handling in the integer mode prior to accumulation;

accumulating aligned products using accumulation circuitry comprising a plurality of parallel adder trees and a hierarchical output accumulator; and normalizing an output sum using normalization circuitry to form an output value in a numeric format.

17. The method of claim 16, wherein operand registers stage the operand values and include streaming operand registers and stationary operand registers.

18. The method of claim 16, wherein exponent alignment during the multiplication is performed by the alignment circuitry, the alignment circuitry comprising the power-of-two generator driving the selection network to align the mantissa product based on the product exponent.

19. The method of claim 16, wherein the power-of-two generator is an address decoder, a lookup table, and combinational logic configured to produce mutually exclusive control lines corresponding to the power-of-two value.

20. An apparatus, comprising:

operand registers for operand values;

compute circuitry configured to produce a mantissa product and a product exponent;

alignment circuitry comprising a power-of-two generator and a selection network coupled to the compute circuitry, the alignment circuitry being configured to:

in a floating-point mode, align the mantissa product as part of multiplication using a power-of-two value corresponding to the product exponent; and in an integer mode, drive the selection network to perform integer multiplications of the operand values;

sign-handling circuitry configured to manage negative values, including two's-complement handling in the integer mode prior to accumulation;

accumulation circuitry comprising a plurality of parallel adder trees and a hierarchical output accumulator; and normalization circuitry configured to form an output value in a numeric format.

* * * * *